United States Patent
Bursell et al.

(10) Patent No.: US 11,949,775 B2
(45) Date of Patent: *Apr. 2, 2024

(54) NETWORK BOUND ENCRYPTION FOR RECOVERY OF TRUSTED EXECUTION ENVIRONMENTS

(71) Applicant: Red Hat, Inc., Raleigh, NC (US)

(72) Inventors: Michael Hingston McLaughlin Bursell, Farnborough (GB); Nathaniel Philip McCallum, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/123,957

(22) Filed: Mar. 20, 2023

(65) Prior Publication Data
US 2023/0246821 A1 Aug. 3, 2023

Related U.S. Application Data

(63) Continuation of application No. 16/918,153, filed on Jul. 1, 2020, now Pat. No. 11,611,431.

(51) Int. Cl.
*H04L 9/08* (2006.01)
*G06F 21/54* (2013.01)
*G06F 21/57* (2013.01)

(52) U.S. Cl.
CPC ............ *H04L 9/0825* (2013.01); *G06F 21/54* (2013.01); *G06F 21/57* (2013.01); *H04L 9/0822* (2013.01); *H04L 9/0866* (2013.01); *H04L 9/0816* (2013.01)

(58) Field of Classification Search
CPC ....... H04L 9/08; H04L 9/0822; H04L 9/0825; H04L 9/0866; H04L 9/0816; H04L 9/0819; H04L 9/088; H04L 9/0891; H04L 9/0894; H04L 9/0861; H04L 63/06; H04L 63/062; H04L 63/08; G06F 21/54; G06F 21/57; G06F 21/53

See application file for complete search history.

(56) References Cited

U.S. PATENT DOCUMENTS 7,941,509 B2   5/2011   Sharma
8,335,915 B2   12/2012  Plotkin
(Continued)

OTHER PUBLICATIONS

"Trust No One, Run Everywhere—Introducing Enarx", 2019, Red Hat, Inc., 8 pages.
(Continued)

*Primary Examiner* — Shaqueal D Wade-Wright
(74) *Attorney, Agent, or Firm* — Womble Bond Dickinson (US) LLP

(57) ABSTRACT

The technology disclosed herein provides network bound encryption that enables a trusted execution environment to persistently store and access recovery data without persistently storing the decryption key. An example method may include: transmitting combined key data that is based on a cryptographic key data of a second computing device to a third computing device; deriving a cryptographic key from combined key data received from the third computing device, the received combined key data being based on the cryptographic key data of the second computing device and cryptographic key data of the third computing device; and causing the trusted execution environment to use the cryptographic key to access sensitive data on a persistent storage device.

20 Claims, 11 Drawing Sheets

(56) References Cited

U.S. PATENT DOCUMENTS

| | | | |
|---|---|---|---|
| 8,572,370 | B1 | 10/2013 | Tormasov |
| 8,843,650 | B2 | 9/2014 | Song |
| 9,047,468 | B2 | 6/2015 | Sakthikumar |
| 9,425,965 | B2 | 8/2016 | Baumann |
| 9,674,182 | B2 | 6/2017 | Smith |
| 9,697,371 | B1 | 7/2017 | Willden |
| 9,722,775 | B2 | 8/2017 | Hjelm |
| 9,985,782 | B2 | 5/2018 | McCallum |
| 10,180,845 | B1 | 1/2019 | Nunes |
| 10,506,012 | B2 | 12/2019 | Lee |
| 10,516,527 | B1 * | 12/2019 | Machani ............... H04L 9/0625 |
| 11,005,829 | B1 * | 5/2021 | Johnson ................. H04L 9/083 |
| 2014/0040890 | A1 | 2/2014 | Novak |
| 2014/0052989 | A1 | 2/2014 | Jones |
| 2015/0058629 | A1 | 2/2015 | Yarvis |
| 2016/0087792 | A1 | 3/2016 | Smith |
| 2016/0350534 | A1 | 12/2016 | Poornachandran |
| 2018/0089438 | A1 | 3/2018 | Oh |
| 2019/0155728 | A1 | 5/2019 | Ferguson |
| 2019/0238323 | A1 | 8/2019 | Bunch |
| 2019/0339986 | A1 | 11/2019 | Khatri |
| 2020/0242267 | A1 | 7/2020 | Weiss |
| 2020/0374112 | A1 | 11/2020 | Sovio |
| 2021/0150065 | A1 | 5/2021 | Qiu |
| 2021/0218560 | A1 | 7/2021 | Nix |
| 2021/0234684 | A1 | 7/2021 | Maruyama |
| 2021/0288792 | A1 * | 9/2021 | Zeh ....................... H04L 9/0841 |
| 2021/0288944 | A1 * | 9/2021 | Petri ....................... H04L 67/14 |

OTHER PUBLICATIONS

"Configuring Automated Unlocking of Encrypted Volumes using Policy-based Decryption", Red Hat, Inc., downloaded Feb. 28, 2020, 12 pages.

"Using Network-Bound Disk Encryption", 2020, Red Hat, Inc., https://access.redhat.com/documentation/en-US/Red_Hat_Enterprise_Linux/7/html/Security_Guide/sec-Using_Network-Bound_Disk_Encryption.html, 12 pages.

Sarhan, A. Y,. et al., "An Approach to Identity Management in Clouds without Trusted Third Parties", Nov. 7, 2014, Western Michigan University, https://arxiv.org/ftp/arxiv/papers/1904/1904.00880.pdf, 11 pages.

Clevis and Tang, "Securing your Secrets at Rest", Janaury 15, 2020, Red Hat, Inc., https://speakerdeck.com/frasertweedale/clevis-and-tang-securing-your-secrets-at-rest, 1 page.

Sen, J., "Security and Privacy Issues in Cloud Computing", Innovation Labs, Tata Consultancy Services Ltd., https://arxiv.org/ftp/arxiv/papers/1303/1303.4814.pdf, downloaded Jan. 15, 2021, 42 pages.

Reyk Floeter, Vxlan and Cloud-based Networking with OpenBSD, https://2017.asiabsdcon.org/papers/abc2014-proc-all.pdf#page=91, Mar. 2014, 202 pages.

* cited by examiner

NETWORK BOUND ENCRYPTION FOR RECOVERY OF TRUSTED EXECUTION ENVIRONMENTS

RELATED APPLICATIONS

This application is a continuation application of co-pending U.S. patent application Ser. No. 16/918,153, filed Jul. 1, 2020, which is incorporated herein by reference.

TECHNICAL FIELD

The present disclosure generally relates to computer systems that provide security enhanced data exchange between computers, and is more specifically related to cryptographic techniques that enable different computing devices to establish a shared cryptographic key.

BACKGROUND

Computers often use cryptographic techniques to restrict access to sensitive content. The cryptographic techniques may involve generating a secret key that is used by a device to enable or restrict access to the sensitive content. The secret key may be something as simple as a passcode or something more complex, such as a cryptographic token. The device may then store the secret key and share the secret key with one or more other computers. The other computers may use the secret key as input to a cryptographic function to access the sensitive content. For example, the secret key may be a cryptographic key to encrypt the sensitive content and may be shared with the other device to enable the other device to decrypt the sensitive content.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
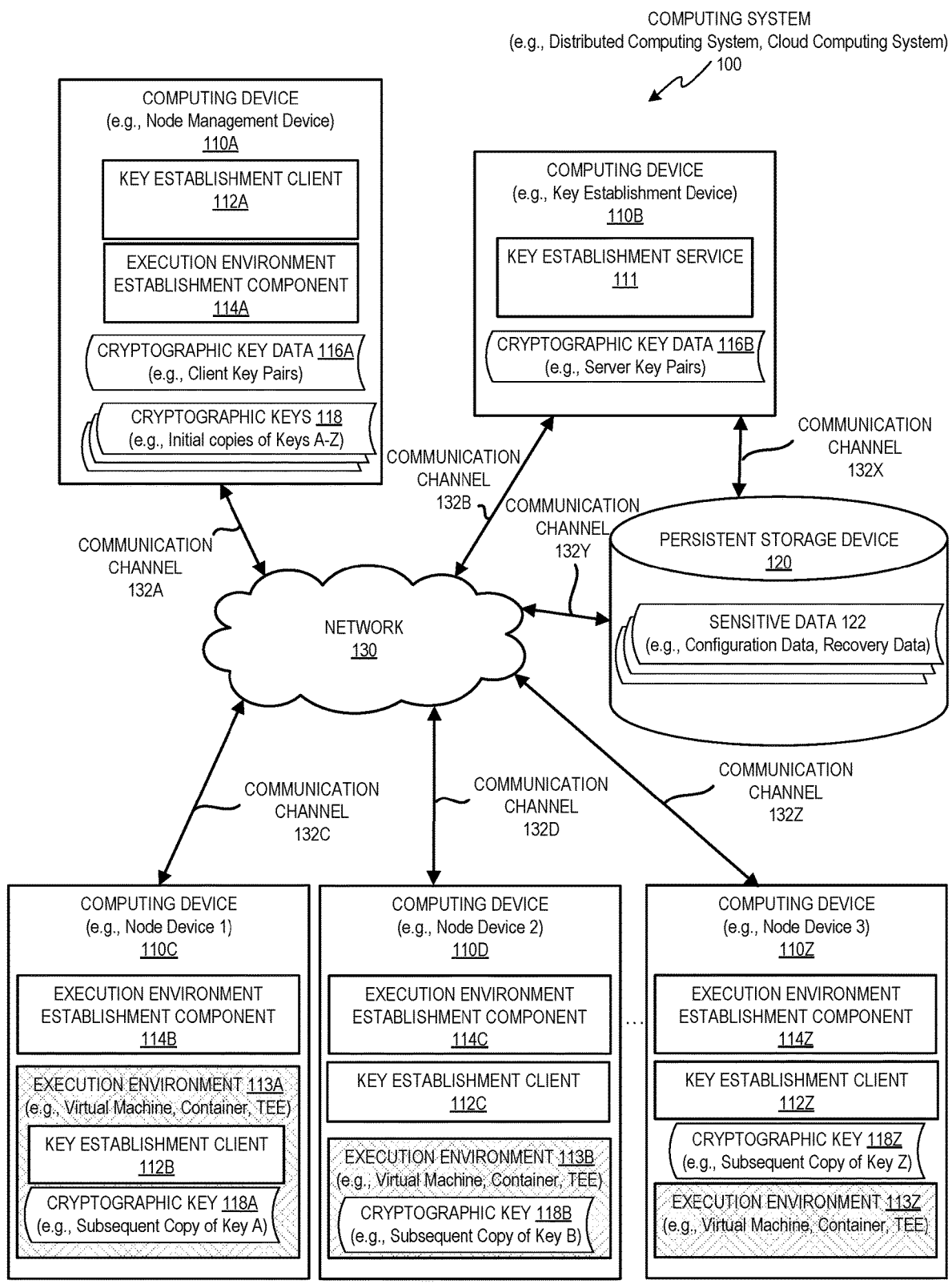
FIG. 1 depicts a high-level block diagram of an example computing system that uses a security enhanced technique to persistently store sensitive data, in accordance with one or more aspects of the present disclosure.

Modern computing systems often use cryptographic techniques to enhance the security of data stored in persistent storage. Data that is persistently stored is more vulnerable to attack then data that is ephemerally stored. This may be because the persistently stored data is stored on a storage device for longer durations and the storage device can be more easily removed and accessed without adversely affecting the stored data. Storing the data in an encrypted form enhances the security of the persisted data but also requires that a decryption key be made available to decrypt the persisted data. Modern computing systems often persistently store the decryption keys in a local or centralized key stores and the key stores become the primary attack surface for malicious actors.

The use of key stores are prevalent in distributed computer systems (e.g., cloud computing systems) where an orchestration server may provision and manage devices of the distributed computer system. The data used for provisioning the devices often includes sensitive data (e.g., configuration data, executable code, virtual machine images) that is encrypted and the cryptographic keys may be persistently stored on the orchestration server or a centralized key distribution server (KDS). The persistently stored sensitive data and cryptographic keys may be copied by a malicious actor to a location external to the network of the distributed computer system. The location external to the network may provide the malicious actor with more computing resources and time to mount an attack on the encrypted sensitive data, the encrypted cryptographic key, or a combination thereof.

The technology disclosed herein enables access to sensitive data of a distributed computer system to be bound to a particular network environment without storing a persistent copy of the cryptographic key. The particular network environment may execute a key establishment service that can be use by a device to derive the cryptographic key and as such the encryption technique may be referred to as network bound encryption. The key establishment service may be absent a copy of the cryptographic key but may enable another device to establish the cryptographic key. The key establishment service may be the same or similar to a key establishment service and may communicate cryptographic key data with the device one or more times to enable the device to establish the cryptographic key. The cryptographic key may not be transmitted in an encrypted or decrypted over the network and the key establishment service may run on a device that remains unaware of the cryptographic key. In one example, the established cryptographic key may be used as an encryption key to encrypt the sensitive data. In other examples, the established cryptographic key may be used as a key encryption key (KEK) to encrypt a key used to encrypt the sensitive data.

The same cryptographic key may be derived multiple times by the same device or by different devices. For example, a first device may communicate with the key establishment service to establish a first copy of the cryptographic key and may use the first copy to encrypt the sensitive data. A second device may subsequently communicate with the key establishment service to establish a second copy of the cryptographic key and may use the second copy to decrypt the sensitive data. Both the first and second devices may establish the key using the same key establishment service or they may use different key establishment services that are running on different networks (e.g., different cloud computing systems). In either example, the each copy of the cryptographic key may be established based on a private key of one device and a public key of another device. For example, the first device may use a client private key and a server public key to establish the first copy (e.g., initial copy of the key) and the second device may then use a client public key and a server private key to establish the second copy (e.g., subsequent copy of the key). The client private key and client public key may be part of the same asymmetric key pair and may be generated by the first device or any other device. Once the client public key is made available to the second device, the second device can use it in collaboration with the key establishment service to derive the second copy of cryptographic key as discussed in more detail below.

Systems and methods described herein include technology for a security enhanced data encryption scheme for persistently storing encrypted data. In particular, aspects of the disclosed technology may enable a computing device to reduce the attack surface of the system by persistently storing sensitive date in an encrypted manner without persistently storing the decryption key. In another example, the disclosed technology may enable devices to distribute encrypted content over a network to multiple devices without distributing the decryption key in an encrypted or decrypted form. In another example, the disclosed technology may enable a device that is executing an ephemeral execution environment (e.g., virtual machine, container, or trusted execution environment) to persistently store data of the ephemeral execution environment and enable it to recover the data after an interruption (e.g., power failure, restart) without persistently storing the decryption key.

Various aspects of the above referenced methods and systems are described in details herein below by way of examples, rather than by way of limitation. The examples provided below discuss an example of the security enhanced encryption scheme that uses different devices on a computer network. In other examples, the different devices may be virtual devices executing on the same physical host machine or on different physical host machines.

FIG. 1 depicts an illustrative architecture of elements of a computer system 100, in accordance with an example of the present disclosure. It should be noted that other architectures for computer system 100 are possible, and that the implementation of a computer system utilizing embodiments of the disclosure are not necessarily limited to the specific architecture depicted. In the example shown in FIG. 1, computer system 100 may include computing devices 110A-Z, execution environments 113A-Z, and network 130.

Computing devices 110A-Z may include any computing devices that are capable of storing or accessing data and may include one or more servers, workstations, desktop computers, laptop computers, tablet computers, mobile phones, palm-sized computing devices, personal digital assistants (PDAs), smart watches, robotic devices (e.g., drone), data storage device (e.g., USB drive), other device, or a combination thereof. Computing devices 110A-Z may include one or more hardware processors based on x86, PowerPC®, SPARC®, ARM®, other hardware, or a combination thereof.

Computing device 110A may manage one or more of the other computing devices and may be referred to as a node management device. The node management device may function as an orchestration server, a provisioning server, other server, or a combination thereof.

Managing the other devices may involve computing device 110A executing one or more operations to install, configure, instantiate, run, or execute one or more programs or devices. As shown in FIG. 1, computing device 110A may include a key establishment client 112A and an execution environment establishment component 114. Key establishment client 112A may enable computing device 110A to communicate with the key establishment service 111 of computing device 110B to establish cryptographic keys 118. Each of the cryptographic keys 118 may be established in view of cryptographic key data 116A (e.g., client key pair) of computing device 110A and cryptographic key data 116B (e.g., server key pair) of computing device 110B. Execution environment establishment component 114A may enable computing device 110A to establish one or more execution environments 113A-Z on one or more of the managed node devices (e.g., computing devices 110C-Z).

Execution environments 113A-Z may each be an isolated execution environment that enables a computing device to isolate the execution of code from other execution environments on the same computing device. An execution environment may be the same or similar to a virtual machine, a container, or a trusted execution environment. The virtual machine (VM) may be established using hardware-virtualization features provided by a hypervisor (e.g., virtual machine monitor) and may be isolated from other virtual machines executing on the same computing device. The container may be established using operating system virtualization features provided by a container runtime (e.g., Docker™, Container Linux™) and may be isolated from other containers executing on the same computing device.

The trusted execution environment (TEE) may be used as an alternative or in addition to the hardware virtualization or operating system virtualization and may be based on security features provided by the processor of the computing device. The trusted execution environment may use hardware based encryption to isolate the data of a process (e.g., user space process, VM, container) from other processes running on the same computing device. In one example, the data of a process executing in the trusted execution environment may be encrypted using cryptographic keys that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process. The trusted execution environment may provide code execution, storage confidentiality, and integrity protection, and may store, execute, and isolate data from other processes executing on the same computing device, as discussed in more detail in regards to FIGS. 3-4.

Each of the execution environments 113A-Z may be an ephemeral execution environment that comprises non-persistent storage of the computing device and uses a cryptographic key to store or retrieve data on persistent storage accessible using a network connection (e.g., communication channel 132Y). The non-persistent storage may include data storage devices that lose data in response to an interruption and may include volatile memory (e.g., main memory), processor registers (e.g., CPU or GPU registers), other non-persistent cache, or a combination thereof. Persistent storage may include data storage that does not lose data in response to an interruption and may include one or more hard disk devices, solid-state storage devices, tape drive devices, network storage devices, other persistent data storage medium, or a combination thereof. The interruptions may be any event that affects the ephemeral execution environment or the ability of the computing device to process or store data of the ephemeral execution environment. The interruption may be the result of an intentional act (e.g., IT administrator command) or unintentional act (e.g., defect) and may be caused by a restart (e.g., process restart or device restart), a failure (e.g., power failure, hardware failure, program failure), other event, or combination thereof. Each of the execution environments 113A-Z may be associated with sensitive data 322.

Sensitive data 322 may be any data that is sensitive in nature and is protected when it is shared between computing devices or is persistently stored. Sensitive data 322 may be the same or similar to confidential data, secret data, or classified data. Sensitive data 322 may include configuration data (e.g., hardware settings, program settings, network settings), state data (e.g., memory values, processor register values), executable image data (e.g., virtual machine image, container image), cryptographic data (e.g., asymmetric key data, symmetric key data, a public or private key, key encryption key), executable data (e.g., executable code, libraries, instructions, opcodes), informational data (e.g., documents, spread sheets, slides, photographs), other data, or a combination thereof. In one example, sensitive data 322 may include data that is used by execution environment 113A to enable it to perform a computing task (e.g., configuration for application execution, recover prior configuration). In which case, execution environment 113A may execute key establishment client 112B to derive cryptographic key 118A and use it to access sensitive data 322. In another example, sensitive data 322 may include data that is used by computing device 110D to enable execution environment 113B to be established. Computing device 110D may execute key establishment client 112C to derive cryptographic key 118B before, during, or after initiating the creation of execution environment 113B (e.g., before instantiating the VM, Container, or TEE).

Sensitive data 322 may be protected using any technique that enhances data confidentiality, data integrity, data availability, or a combination thereof. The technique may be a cryptographic technique that uses one of the cryptographic keys 118 to encrypt sensitive data 322 before being transmitted over network 130 and stored on persistent storage device 120. Sensitive data 322 may be encrypted using a first copy of a cryptographic key and subsequently decrypted using a second copy of the same cryptographic key. The first copy may be referred to as an initial copy of the key and the second copy may be referred to as a subsequent copy of the key. In one example, the same computing device may establish both the copies and the first copy may be established before an interruption and the second copy may be established after the interruption (e.g., different instances of the ephemeral execution environment). The same computing device may establish both copies in order to persistently store sensitive data without making a persistent copy of the cryptographic key, which may enhance security. In another example, the copies of the cryptographic key may be established by different computing devices and a first computing device (e.g., node management device or node device 1) may want to provide a second device (e.g., node device 2) with security enhanced access to persistently stored sensitive data 322.

Cryptographic keys 118 may each be a piece of information that can be used to protect or enable a computing device to access sensitive data 322. Cryptographic keys 118 may exist in a human readable form (e.g., passcode, password), a non-human readable form (e.g., digital token or digital certificate), other form, or a combination thereof. Cryptographic keys 118 may be input to a cryptographic function, output of a cryptographic function, or a combination thereof. Cryptographic keys 118 may be referred to as access keys and enable the computing device in possession of the key to access sensitive data 322. In one example, one of the cryptographic keys 118 may be used to encrypt or decrypt sensitive data 322. In another example, one of the cryptographic keys 118 may be a key encryption key (KEK) that is used to encrypt the cryptographic key used to encrypt or decrypt sensitive data 322. Each of the cryptographic keys 118 may be or include one or more encryption keys, key encryption keys, decryption keys, session keys, transport keys, migration keys, authentication keys, authorization keys, digital certificates, integrity keys, verification keys, digital tokens, license keys, signatures, hashes, other data or data structure, or a combination thereof. Cryptographic keys 118 may include a set of keys and each key in the set may be associated with sensitive data for a particular computing device or a particular execution environment on the computing device. Each of the cryptographic keys 118 may be established using cryptographic key data 116A and 116B.

Cryptographic key data 116A and 116B may be similar to cryptographic keys 118 and may include one or more cryptographic bit sequences or other cryptographic keying material for storing, generating, deriving, or establishing a set of one or more cryptographic keys. Cryptographic key data 116A may be stored on or generate by computing device 110A (e.g., node management server) and may include one or more asymmetric key pairs that each include a public asymmetric key (e.g., client public key) and a private asymmetric key (e.g., client private key). Cryptographic key data 116B may be stored on or generate by computing device 110B (e.g., key establishment server) and may include one or more asymmetric key pairs that each include a public asymmetric key (e.g., server public key) and a private asymmetric key (e.g., server private key).

Cryptographic keys 118 be used by one or more of the computing devices 110A-Z in combination with an asymmetric and/or symmetric cryptographic systems. A symmetric key cryptographic system may use the same cryptographic keys for encryption of plaintext and for decryption of ciphertext. The cryptographic keys used in a symmetric key cryptographic system may be referred to as symmetric keys and may be identical keys (e.g., copies of the same key) or there may be a simple transformation to go between keys of a symmetric key pair. The symmetric key cryptographic system may involve stream ciphers, block ciphers, other cipher, or a combination thereof. The stream ciphers may encrypt individual elements (e.g., digits, characters) of a message one at a time. Block ciphers may take a set of elements and encrypt them as a single unit and may or may not pad the resulting plaintext so that it is a multiple of a block size of n bits (e.g., 64 bit, 128 bit, 256 bit, 1024 bit). In one example, the symmetric key cryptographic system may use one or more key wrap constructions that wrap or encapsulate cryptographic key material. The constructions may be built from standard primitives such as block ciphers and cryptographic hash functions. In other examples, the symmetric key cryptographic system may be the same or similar to Advanced Encryption Standard (AES), Galois/Counter Mode (GCM), Triple Data Encryption Standard (3DES, TDES), International Data Encryption Algorithm (IDEA), Blowfish, Lattice-based cryptography, multivariate cryptography (e.g., rainbow scheme), super singular elliptic curve cryptography, super singular isogeny graphs cryptography, other cryptographic system, or a combination thereof.

An asymmetric key cryptographic system may use different keys for encryption and decryption. A first key may be used to encrypt plaintext into ciphertext and a second key may be used to decrypt the ciphertext into plaintext. The first and second keys may be referred to as an asymmetric pair and may be different keys that may or may not be mathematically related. In one example, the asymmetric key cryptographic system may be a public key cryptographic system and the first key may be a public asymmetric key (e.g., shared key) and the second key may be a private asymmetric key (e.g., secret key). The term public asymmetric key may be used interchangeably with public key and private key and the term private asymmetric key may be used interchangeably with private key. The public key may be published and accessible to multiple computing devices and the private key may remain secret and accessible to one or more computing device associated with a particular entity (e.g., user). A public key cryptographic system may enable any device to encrypt data using the public key of a recipient computing device and the encrypted data may be decrypted with the recipient's private key. Either cryptographic system may enable the transfer of encrypted data over network 130 using one or more communication channels 132A-Z.

Network 130 may be a public network (e.g., the internet), a private network (e.g., a local area network (LAN) or wide area network (WAN)), or a combination thereof. In one example, network 130 may include a wired or a wireless infrastructure, which may be provided by one or more wireless communications systems, such as a wireless fidelity (WiFi) hotspot connected with the network 130 and/or a wireless carrier system that can be implemented using various data processing equipment, communication towers, etc.

Communication channels 132A-Z may include any communication channel that is capable of communicating data between computing devices and may include one or more connections. The connections may be network connections, computer-to-computer connections, peripheral connection, other connections, or a combination thereof. A network connection may be an indirect connection that traverses one or more network nodes (e.g., access points, switches, routers, or other networking infrastructure device) and may communicably couple one of computing devices with one or more other computing devices. A computer-to-computer connection may be the same or similar to a peer-to-peer connection and may be a direct connection between computing devices (e.g., bluetooth connection, WiFi Direct, ad-hoc network connection). A peripheral connection may be a connection that uses a direct physical connection between an adapter of the computer and an adapter of the portable data storage device (e.g., Universal Serial Bus (USB) connection). The peripheral connection may exist when one of the computing devices is a computer and the other is a portable data storage device (e.g., USB drive, key fob, secure card).

Communication channels 132A-Z may exist for different durations of time and at different points in time. This may occur when one of the computing devices is moved or reconfigured to communicate with other computing devices. One or more of the computing devices may be physically moved or logically moved between locations to communicate with one or more of the other computing devices (e.g., computing devices 110B-Z). Physically moving a computing device may change a physical location of the computing device and may involve transporting the computing device between geographic locations. Logically moving a computing device may change a logical location of the computing device and may involve transitioning the computing device between different virtual locations (e.g., different networks by changing network cables or settings). The physical or logical movement may be implemented or caused by the computing device. In one example, the computing device 110A may be a mobile device that includes the ability to move or other locomotion features and may be the same or similar to an autonomous vehicle (e.g., robot, drone). In another example, the computing device may be capable of being moved and may communicate with an external entity (e.g., user, robot) that can move the mobile device. In either example, the physical or logical move may transition the computing device from a first location with access to a first set of one or more computing devices to a second location with access to a second set of one or more computing devices. Computing device 110A may then use communication channels 132A-Z to communicate with the computing devices at different times and locations.

A computing device may establish one of the communication channels 132A-Z with a computing device at a first time and then remove the established communication channel before, during, or after establishing a subsequent communication channel with a second computing device. The one or more subsequent communication channels may be established sequentially or in parallel at subsequent points in time. In another example, one or more of communication channels may be a persistent communication channel and may exist before, during, and after other communication channels are established or removed. In either example, a computing device 110A (e.g., node management device) may be absent a communications channel with computing device 110B (e.g., key establishment device) and the absence may remain, in which case the node devices may establish both the initial copy of cryptographic keys 118 and subsequent copies of cryptographic keys 118A-Z. The establishment of the initial and subsequent copies of the cryptographic keys 118 is discussed in more detail in regards to FIG. 2.

Figure 2:
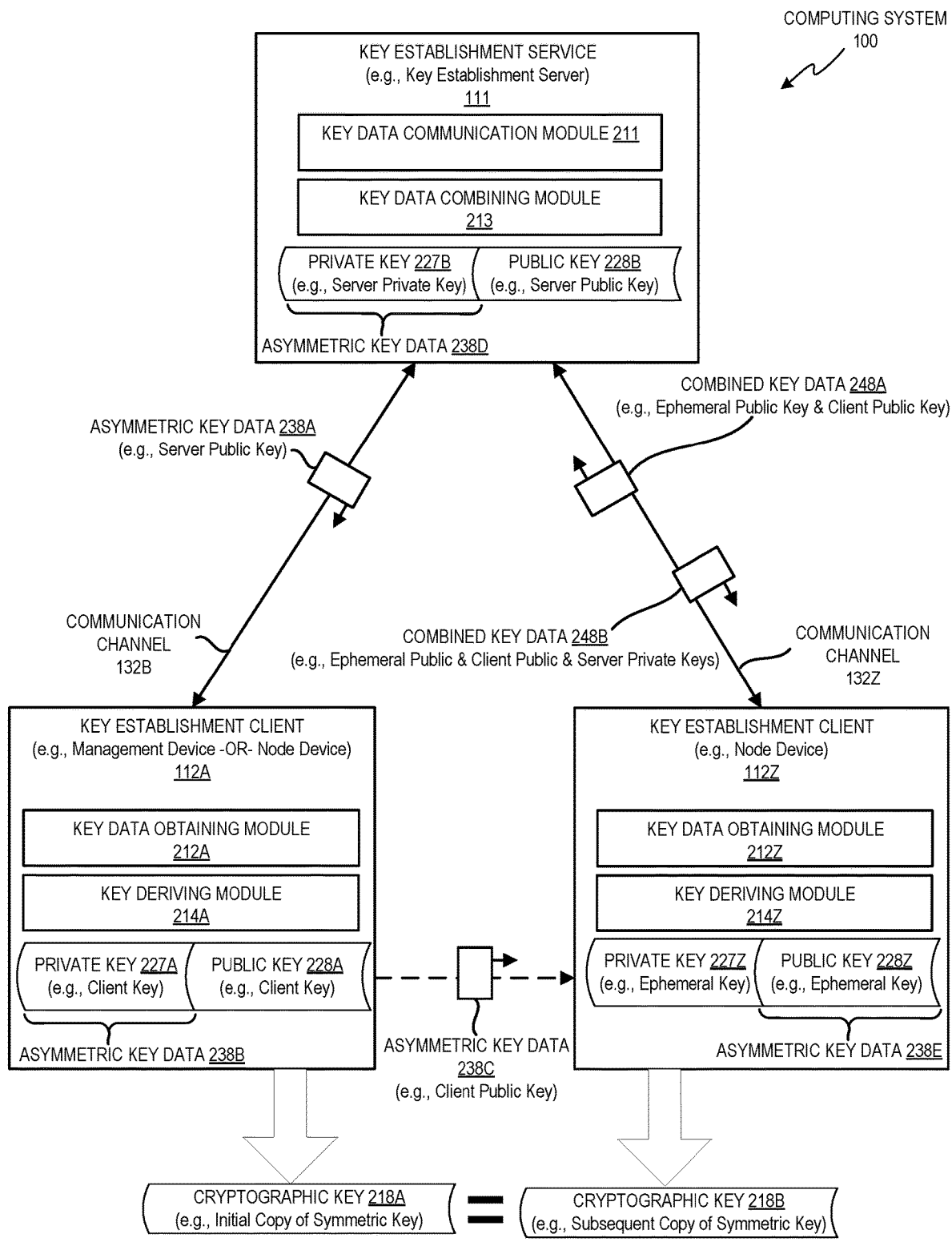
FIG. 2 depicts a block diagram of a key establishment service used by the computing system, in accordance with one or more aspects of the present disclosure.

FIG. 2 depicts a block diagram illustrating how key establishment service 111 and key establishment clients 112A-Z communicate with one another, in accordance with one or more aspects of the present disclosure. Key establishment service 111 may communicate with one or more key establishment clients 112A-Z to produce copies of a cryptographic key or mathematically related cryptographic keys. A key establishment client and a key establishment service may execute on different physical computing devices or on the same physical device. In one example, the node management device may execute the key establishment client 112A to derive an initial copy of a cryptographic key (e.g., the symmetric key for encryption) and one of the node devices may execute key establishment client 112Z to derive a subsequent copy of the cryptographic key (e.g., the symmetric key for decryption). In another example, a node device may execute key establishment client 112A to derive the initial copy of the cryptographic key and the same node device or a different node device may execute key establishment client 112Z to derive the subsequent copy of the cryptographic key.

The techniques performed by computing system 100 for establishing cryptographic keys 218A-B may vary depending on whether the cryptographic key being established is an initial copy of a key or a subsequent copy of a key. The key establishment service 111 and key establishment clients 112A-Z may have a server-client relationship and the computing device executing the key establishment service 111 may be referred to as a server device and the computing devices executing the key establishment service 111A-Z may be referred to as a client devices, even though any type of computing device may be used for each device (e.g., server, laptop, mobile phone). As shown in FIG. 2, key establishment client 112A may run on a client device and establish the initial copy of the key and key establishment client 112Z may run on another client device and establish a subsequent copy of the key.

The cryptographic technique for establishing the initial copy of the cryptographic key may be performed by key establishment client 112A using key data obtaining module 212A and Key deriving module 214A. Key data obtaining module 212A may enable the client device to obtain cryptographic key data from different devices to derive cryptographic key 218A. Key obtaining module 212A may obtain cryptographic key data from a remote computing device by transmitting a request for cryptographic key data (e.g., server public key) over a network to the remote computing device. In one example, key establishment client 112A may transmit a message (e.g., request) to key establishment service 111 and may receive a message (e.g., response) with asymmetric key data 238A of the key establishment service 111. The asymmetric key data 238A may include a public key 228A (e.g., server public key) and may be a public portion of an asymmetric key pair that includes private key 227B (e.g., server private key). Key obtaining module 212A may also obtain cryptographic key data of the local client device. The cryptographic key data of the local client may include asymmetric key data that includes one or more asymmetric key pair that are generated by the local client, assigned or provided to the local client by a management device, or a combination thereof. As shown in FIG. 2, the asymmetric key pair of the local client may include private key 227A (e.g., client private key) and public key 228A (e.g., client public key).

Key deriving module 214A may enable the client device to generate cryptographic key 218A using cryptographic key data received from the different devices. In one example, the cryptographic key 218A may be a symmetric key and may be derived based on asymmetric key data 238A of the key establishment service 111 and asymmetric key data 238B of the key establishment client 112A. Key deriving module 214A may generate cryptographic key 218A using one or more cryptographic key functions that are the same or similar to a key derivation function (KDF), a key generator function (e.g., keygen), other cryptographic function, or a combination thereof. In one example, the key generator function may create a single cryptographic key based on one or more asymmetric keys (e.g., server public key and client private key) and may or may not include other input data (e.g., key length value, base key, seed value, salt value, nonce value). The key derivation function may involve key strengthening (e.g., key hardening), key stretching (e.g., key lengthening), other key modification, or a combination thereof. The key derivation function may or may not enhance the security of the key or adjust the length of the key to comply with a particular format (e.g., minimum key length).

Cryptographic key 218A may be a symmetric key that is used to protect sensitive data 322. Cryptographic key 218A may be referred to as an initial key because it is identical to or mathematically related to a subsequent key discussed below (e.g., cryptographic key 218B). The initial key may be used by the client device to protect the sensitive data 322 before, during, or after sensitive data 322 is stored on persistent storage device 120. In one example, the client device may encrypt the sensitive data 322 using the initial key and then discard (e.g., delete, erase, wipe) all instances of the cryptographic key 218A, client private key 227A, and server public key 228B. The client device executing key establishment client 112A may then store the client public key 228A so that it can be shared with the client device that will be establishing the subsequent key.

The cryptographic technique for establishing the subsequent copy of the cryptographic key may be performed by key establishment client 112Z and result in the generation of cryptographic key 218B. The cryptographic key discussed above may be generated using the server public key and the client private key, but after discarding all instances of the client private key the possibility of generating the cryptographic key using the server public key and the client private key no longer exists. Therefore, any subsequent generation of the cryptographic key may use asymmetric data that complements the asymmetric data previously used to generate the initial copy of the cryptographic key. In this instance, the complementary asymmetric data may be the server private key 227B and the client public key 228A. For security reasons, the server device and its key establishment service 111 may keep private key 227 secret and avoid sharing it with any client devices. As such, the key establishment client 112Z may also communicate with key establishment service 111.

As shown in FIG. 2, key establishment client 112Z may include a key data obtaining module 212Z and key deriving module 214Z, which may be the same or similar to modules 212A and 214A. Key obtaining module 212Z may enable a client device to obtain cryptographic key data from different devices. Key obtaining module 212Z may obtain cryptographic key data of the local client device that includes one or more asymmetric key pairs that are generated by the local client or provided to the local client by key generation device. The generated cryptographic key data may be asymmetric key data that is ephemeral and is used for communicating with key establishment service 111 to establish a particular key and each key that is established may use a different ephemeral asymmetric key pair. As shown in FIG.

2, the asymmetric key pair may include a private key 227Z (e.g., ephemeral private key) and a public key 228Z (e.g., ephemeral public key).

Key obtaining module 212Z may also obtain asymmetric key data 238C that is the public portion of the client asymmetric key pair used to generate the initial copy of the key.

Asymmetric key data 238C may therefore include client public key 228A and may have originally been generated by the client device executing key establishment client 112A or by another device (e.g., node management device, key generation device). Key obtaining module 212Z may receive or access the asymmetric key data 238C from a storage location on the local computing device or from a remote device (e.g., node management device, the persistent storage device, a key distribution service, or other intermediate device).

Key obtaining module 212Z may also obtain asymmetric key data 238D, which may be the private portion of the server asymmetric key pair used to generate the initial copy of the key. Asymmetric key data 238D may be based on server private key 227B but may be provided using a technique that keeps server private key 227B hidden from the client device receiving it. The technique may keep the server private key 227B hidden (e.g., blinded, masked, obfuscated) by combining the server private key 227B with other cryptographic key data. In one example, Key obtaining module 212Z may use asymmetric key data 238C (e.g., client public key) and asymmetric key data 238E (e.g., ephemeral public key) to generate combined key data 248A and send combined key data 248A to the key establishment service 111. Key establishment service 111 may then use key data combining module 213 to generate combined key data 248B using combined key data 248A and asymmetric key data 238E (e.g., server private key 227B) to produce combined key data 248B. Key establishment service 111 may then transmit the combined key data 248B to key establishment client 112Z.

Key deriving module 214Z may access the combined key data 248B and use it to generate the cryptographic key 218B. Combined key data 248B may be generated in view of the client public key 228A, the server private key 227B, and the ephemeral public key 228Z. Key deriving module 214Z may then use the ephemeral private key 227Z to separate the ephemeral public key 228Z from the combined key data 248 to generate cryptographic key 218B. An advantageous of this technique is that cryptographic key 218B is known to key establishment client 112 without being known to key establishment service 111 or being transmitted over a network connection (e.g., communication channels 132A-Z).

The process of combining cryptographic key data and separating cryptographic key data may involve one or more mathematical operations. As discussed above, both the key establishment service and key establishment client may combine cryptographic key data and may do so using the same mathematical operations or different mathematical operations. The technique of combining cryptographic key data may be the same or similar to blending, merging, transforming, blinding, masking, obfuscating, or encrypting the cryptographic key data. Therefore, combined key data 248A-B may be the same or similar to blended key data, merged key data, transformed key data, blinded key data, masked key data, obfuscated key data, encrypted key data, other term, or a combination thereof. Combined key data 248A-B may include data of or derived from an asymmetric key (e.g., public key, private key), a symmetric key (e.g., secret key), message data (e.g., plaintext or ciphertext), other data, or a combination thereof. The mathematical operations may be the same or similar to those used for an ElGamal Encryption System, Diffie-Hellman Key Exchange, an Elliptical Curve Diffie Hellman (ECDH or ECDHE), other key exchange technique, or a combination thereof.

In one example, generating the asymmetric key pair may involve generating a cyclic group G of order q with generator g, wherein e represents the unit element of G. An integer x may be chosen at random from $\{1, \ldots, q-1\}$ and h may be calculated based on the mathematical equation $h:=g^x$. The public key may be based on or include the values (G, q, g, h) and private key may be based on or include the value x.

Combining data may involve mapping a message M to an element m of G using a reversible mapping function. This may involve choosing an integer y randomly from $\{1, \ldots, q-1\}$ and computing a shared secret $s:=h^y$. This may also involve computing $c_1:=g^y$ and $c_2:=m*s$ and generating ciphertext $(c_1, c_2)$ as the combined key data. Knowledge of both the ciphertext $(c_1, c_2)$ and the plaintext m may enable the recipient computing device to compute the shared secret s, since $c^2*m^{-1}=s$ (e.g., cryptographic key 218A or 218B). A new y and hence a new s may be generated for every message to improve security. For this reason, y may be referred to as an ephemeral key.

Separating the combined key data may involve decrypting ciphertext $(c_1, c_2)$ with private key x. The separating may involve computing the shared secret s used to generate the combined key data, since $s:=c_1^x$ and $c_1=g^y$, $c_1^x=g^{xy}=h^y$. The separating may also involve computing the inverse of the shared secret s in group G (i.e., $s^{-1}$). The inverse of the shared secret may be computed using one or more techniques. A first technique may be used when G is a subgroup of a multiplicative group of integers modulo n. In which case, the modular multiplicative inverse can be computed using an Extended Euclidean Algorithm. A second technique may be to compute the inverse of the shared secret $(s^{-1})$ as $c_1^{q-x}$. This is the inverse of s because of Lagrange's theorem, since $s*c_1^{q-x}=g^{xy}*g^{(q-x)y}=(g^q)^y=e^y=e$. The separating may also calculate the original message m (m:=c2*s−1) and map m back to the plaintext message M. The secret share discussed above may be cryptographic key 218B or cryptographic key 218B.

Cryptographic key 218B may be identical to or mathematically related to cryptographic key 218A and may be generated at a later time, by a different execution environment, by a different computing device, or a combination thereof. In one example, cryptographic key 218A may be a first copy of a symmetric key (e.g., original key for encryption) and cryptographic key 218B may be a second copy of the same symmetric key (e.g., subsequent copy of key for decryption).

Figure 3:
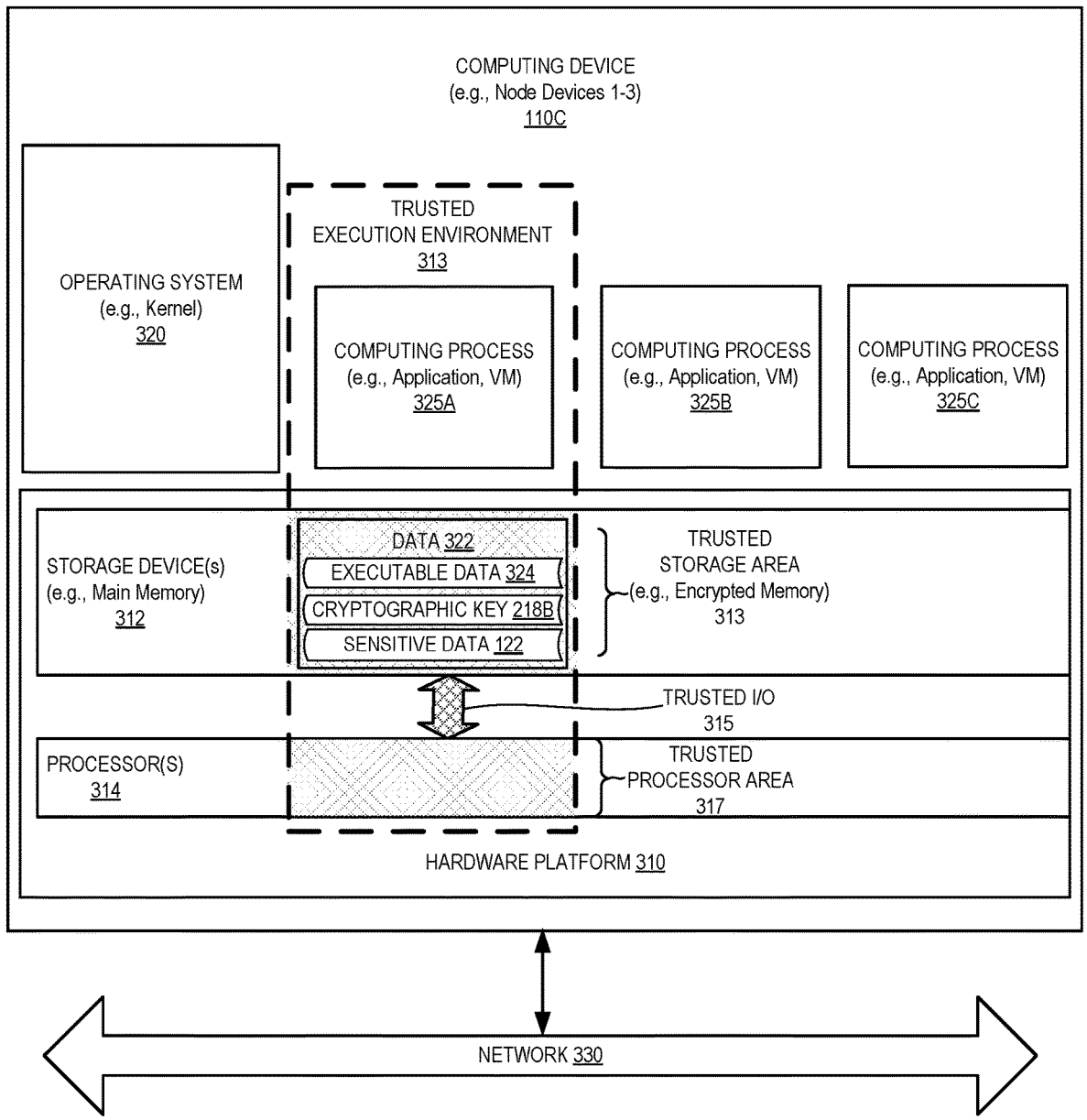
FIG. 3 depicts a block diagram of an example computing device that includes a trusted execution environment, in accordance with one or more aspects of the present disclosure.

FIG. 3 depicts an example of an execution environment that may be established in computing device 110C, in accordance with an embodiment of the present disclosure.

Computing device 110C may be the same or similar to one or more of computing devices 110C-Z of FIG. 1 (e.g., node devices 1-3) and may be managed by computing device 110A (e.g., node management device). As discussed above, an execution environment may be a virtual machine, a container or a trusted execution environment. In the example shown in FIG. 3, computing device 110C includes an execution environment that is a trusted execution environment 313 and may include a hardware platform 310, an operating system 320, one or more computing processes 325A-C, and a network 330. It should be noted that other architectures for computing device 110C are possible, and that the implementations of the computing device utilizing embodiments of the disclosure are not necessarily limited to the specific architecture depicted.

Hardware platform 310 may include one or more hardware devices that perform computing tasks for computing device 110C. Hardware platform 310 may include one or more data storage devices, computer processors, Basic Input Output services (BIOS), code (e.g., firmware, microcode), other aspects, or a combination thereof. One or more devices of the hardware platform 310 may be combined or consolidated into one or more physical devices or may partially or completely emulated as a virtual device or virtual machine. In the example in FIG. 3, hardware platform 310 may include one or more storage devices 312 and processors 314.

Storage devices 312 may include any data storage device that is capable of storing data and may include physical memory devices. The physical memory devices may include volatile memory devices (e.g., RAM, DRAM, SRAM), non-volatile memory devices (e.g., NVRAM), other types of memory devices, or a combination thereof. Storage devices 312 may also or alternatively include mass storage devices, such as hard drives (e.g., Hard Disk Drives (HDD)), solid-state storage (e.g., Solid State Drives (SSD)), other persistent data storage, or a combination thereof. Storage devices 312 may be capable of storing data 322 associated with one or more of the computing processes 325A-C. In one example, data of computing process 325A may be received from a device that is internal or external to computing device 110C. Data may be encrypted using a cryptographic key that was provided (e.g., determined, derived, generated, assigned) by computing device 110C or by a different computing device. The received data may be decrypted using the same cryptographic key or a derivative of the cryptographic key and the decrypted data may be loaded into the trusted execution environment 313 (as shown by data 322) before, during or after being re-encrypted. Data 322 may include executable data 324, cryptographic key 218B, sensitive data 322, other data or a combination thereof.

Executable data 324 may be loaded into trusted execution environment 313 and may enable computing device 110C to establish cryptographic key 218B and interact with sensitive data 322. Executable data 324 may be stored in any format and may include one or more file system objects (e.g., files, directories, links), database objects (e.g., records, tables, field value pairs, tuples), other storage objects, or a combination thereof. Executable data 324 may implement logic for controlling the retrieval, storage, or access to sensitive data 322. In one example, executable data 324 and sensitive data 322 may be received from the same computing device and loaded into the trusted execution environment 313 together. In another example, executable data 324 and sensitive data 322 may be received from different computing devices and loaded separately into trusted execution environment 313. For example, the executable data 322 may be received from or generated by a first computing device and portions of sensitive data 322 may be received from one or more other computing devices. In either example, executable data 324 may include executable code and may be stored and executed in the trusted execution environment 313 by processors 314.

Processors 314 may be communicably coupled to storage devices 312 and be capable of executing instructions encoding arithmetic, logical, or I/O operations. Processors 314 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 314 may be a single core processor, which may be capable of executing one instruction at a time (e.g., single pipeline of instructions) or a multi-core processor, which may simultaneously execute multiple instructions. Processors 314 may interact with storage devices 312 and provide one or more features defined by or offered by trusted systems, trusted computing, trusted computing base (TCB), trusted platform module (TPM), hardware security module (HSM), secure element (SE), other features, or a combination thereof.

Processors 314 may establish a trusted execution environment across multiple hardware devices of hardware platform 310 (e.g., processor and storage devices) and may include instructions (e.g., opcodes) to initiate, configure, and maintain the trusted execution environment 313. In one example, a trusted execution environment may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, IBM PEF, RISC-V Sanctum, other technology, or a combination thereof.

Trusted execution environment 313 may be a security enhanced area in computing device 110C that may guard data of a computing process from being accessed by other computing processes on computing devices 110A-C. A trusted execution environment may be the same or similar to a trust domain and may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environment 313 may protect data 322 while data 322 is in use (e.g., processed by processor 314), is in motion (e.g., transmitted over network 330), is at rest (e.g., stored in storage device 312), or a combinational thereof. Trusted execution environment 313 may be a set of one or more trusted execution environments and each of the trusted execution environments may be referred to as an instance of a trusted execution environment (i.e., TEEi). Each trusted execution environment 313 may isolate data of at least one process executed in trusted execution environment from processes executing external to the trusted execution environment. The at least one process may be a set of one or more processes associated with an execution construct being guarded by the trusted execution environment 313.

The execution construct may be a virtual machine, container, computing process, thread, instruction stream, or a combination thereof. In one example, trusted execution environment 313 may execute a particular virtual machine (e.g. VM based TEE) and may guard data of the virtual machine from a hypervisor managing the virtual machine. In this example, computing device 110C may execute executable code in trusted execution environment 313 as a virtual machine process and the executable code in the trusted execution environment may be accessible to the virtual machine process and inaccessible to a hypervisor managing the virtual machine process. As such, the trusted execution environment 313 of computing device may host a virtual machine that executes the executable data and all the data in the trusted execution environment may be accessible to the virtual machine and inaccessible to a hypervisor managing the virtual machine.

In another example, trusted execution environment 313 may be associated with a particular computing process (e.g., process based TEE) and may guard data of the particular computing process from being access by other equally privileged, higher privileged, or lower privileged computing processes (e.g., guard application process against higher privileged Operating System (OS) process). In this example, computing device 110C may execute the executable code in trusted execution environment 313 as one or more application processes and the executable code in the trusted execution environment 313 may be accessible to the one or more application processes and inaccessible to a kernel managing the one or more application processes. As such, trusted execution environment 313 of computing device 110C may host one or more application processes that execute the executable data and the data in the trusted execution environment may be accessible to the one or more application processes and be inaccessible to a kernel managing the one or more application processes. In either example, the data in the trusted execution environment 313 may be guarded by storing the data 322 in a trusted storage area 313.

Trusted storage area 313 may be an area of one or more storage devices 312 that stores data of a computing process. As shown in FIG. 3, trusted storage area 313 may be a part of trusted execution environment 313 and may store data 322 of computing process 325A in an encrypted form. Data 322 may be encrypted and decrypted by hardware devices using cryptographic input that includes one or more cryptographic keys. In one example, the cryptographic keys may be accessible to the hardware devices (e.g., processor 314) and may be inaccessible to operating system level processes executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, process transparent encryption, other term, or a combination thereof and may use cryptographic key data (e.g., encryption and decryption keys) that are accessible to the processor and are inaccessible to all processes executed external to the trusted execution environment 313.

Trusted storage area 313 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 313 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 313 may be transmitted to other hardware devices using trusted IO 315.

Trusted IO 315 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 3, trusted IO 315 may enable the data of computing process 325A to be transmitted between trusted storage area 313 and trusted processor area 317.

Trusted processor area 317 may be a portion of processor 314 that is associated with computing process 325A and guards data of computing process 325 from being accessed or modified by computing processes 325B-C. Trusted processor area 317 may include a portion of processor 314 that stores the data (e.g., CPU cache, processor memory or registers) and a portion of processor 314 that executes the data (e.g., processor core). Trusted processor area 317 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging).

Computing device 110C may use the same processor and storage device to establish multiple instances of trusted execution environment 313. Each instance of a trusted execution environment (e.g., TEEi) may be established for a particular set of one or more computing processes and may be associated with a particular memory encrypted area. The instances of a trusted execution environment may be provided by the same hardware (e.g., processor and memory) and may exist at different times (e.g., one before an interruption and one after the interruption) or may exist at the same time and be associated with a different memory encrypted area and a different set of one or more processes (e.g., set including an individual process or set of all processes of a VM).

Each trusted execution environment instance may guard all data of a computing process or a portion of the data of a computing process. For example, computing process 325A (e.g., application or VM) may be associated with both a trusted execution environment and an untrusted execution environment. In this situation, a first portion of the data of computing process 325A may be stored and/or executed within trusted execution environment 313 and a second portion of the data of computing process 325A may be stored and/or executed within an untrusted execution environment. The second portion may be stored in the same storage device as the first portion but the second portion may be stored in a decrypted form and may be executed by processor 314 in a manner that enables another process (e.g., multiple higher privileged processes) to access or modify the data. In either example, computing device 110C may execute one or more of the computing processes 325A-C in parallel.

Each of the computing processes 325A-C may include one or more streams of execution for executing programmed instructions. A stream of instructions may include a sequence of instructions that can be executed by one or more processors. Each of the computing processes may be managed by an operating system 320 or may part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 325A-C may correspond to one or more applications, containers, virtual machines, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 314 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 320 may include one or more programs that are run to manage one or more of the computing processes 325A-C. Operating system 320 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 320 may be a host operating system, guest operating system, or a portion thereof and the computing processes 325A-C may be different applications that are executing as user space processes. In another example, operating system 320 may be a hypervisor that provides hardware virtualization features and the computing processes 325A-C may be different virtual machines. In yet another examples, operating system may include a container runtime (e.g., Docker, Container Linux) that provides operating system level virtualization and the computing processes 325A-C may be different containers. In further examples, operating system 320 may provide a combination thereof (e.g., hardware virtualization and operating system level virtualization).

The kernel of operating system 320 may segregate storage devices 312 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 312 associated with the enhanced privileges may be designated as kernel space and the portion of storage devices 312 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 110C (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 4:
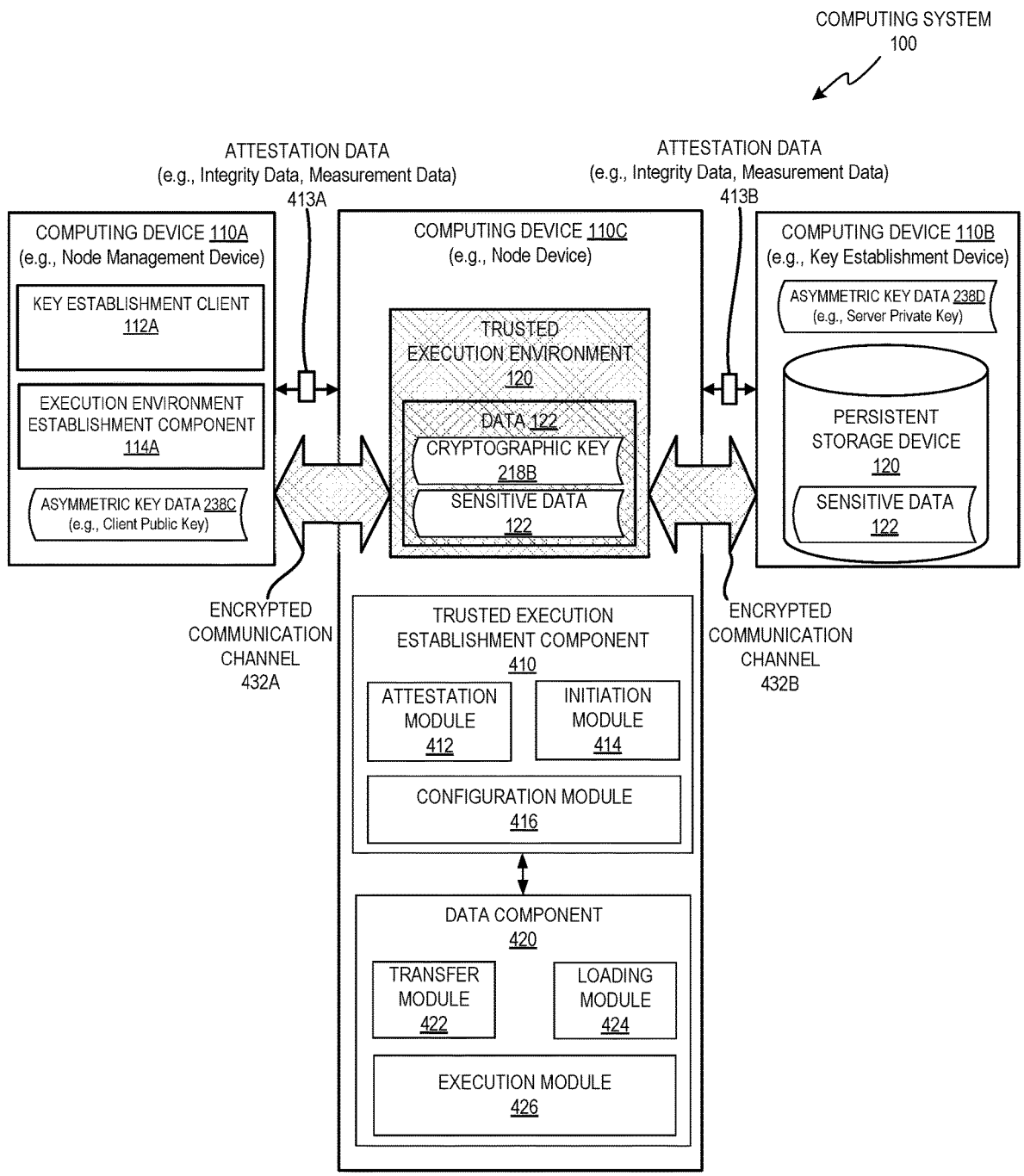
FIG. 4 depicts a block diagram of an example computing device that functions as a node device and uses a trusted execution environment to establish a cryptographic key using asymmetric key data of different computing devices, in accordance with one or more aspects of the present disclosure.

FIG. 4 depicts a block diagram illustrating an exemplary computing system 100 with a computing device 110C that executes a key establishment client in a trusted execution environment 313. In one example, computing device 110C may execute key establishment client 112A to establish the initial cryptographic key or key establishment client 112Z to establish the subsequent cryptographic key. In the example below, the latter scenario is described and trusted execution environment 313 may execute the key establishment client 112A and receive cryptographic key data from computing device 110A (e.g., node management server) and cryptographic key data from computing device 110B (e.g., key establishment server).

Computing device 110C may include a trusted execution establishment component 410 and a data component 420. The components and modules discussed herein may be performed by any computing device. For example, one or more of the components or modules discussed below may be performed by processor circuitry, processor firmware, a driver, a kernel, an operating system, an application, other program, or a combination thereof. More or less components or modules may be included without loss of generality. For example, two or more of the components may be combined into a single component, or features of a component may be divided into two or more components. In one implementation, one or more of the components may reside on different computing devices.

Trusted execution establishment component 410 may enable computing device 110C to establish one or more trusted execution environments 313 in computing device 110C. Establishing a trusted execution environment may involve creating a new trusted execution environment or updating an existing trusted execution environment. Each of the one or more trusted execution environments 313 may be associated with a set of one or more computing processes and may store and execute data of the set of computing processes. In one example, trusted execution establishment component 410 may include an attestation module 412, an initiation module 414, and a configuration module 416.

Attestation module 412 may enable computing device 110C to perform an attestation to verify the integrity of computing device 110C (e.g., integrity of hardware platform 310, operating system 320, and/or one or more computer processors 314A-C). Attestation may enable a program to check the capabilities of computing device 110C and to detect unauthorized changes to programs, hardware devices, other portions of computing device, or a combination thereof. The unauthorized changes may be the result of malicious, defective, or accidental actions by a program or hardware device. The attestation may involve performing local attestation, remote attestation, or a combination thereof. Local attestation may involve enabling a program executed locally on computing device 110C to verify the integrity of computing device 110C. Remote attestation may involve enabling a program executed remotely on a different computing device (e.g., 110A, 110B) to verify the integrity of computing device 110C. The remote attestation may be performed non-anonymously by disclosing data that uniquely identifies computing device 110C or anonymously without uniquely identifying computing device 110C (e.g., Direct Anonymous Attestation (DAA)). In either example, attestation module 412 may perform one or more attestation operations to determine attestation data 322A-B and may transmit attestation data 322A-B to the programs executing on the local or remote computing devices for verification.

Attestation data 322A-B may be based on the configuration of computing device 110C and may represent the capabilities of the hardware platform, trusted execution environment, executable code, or a combination thereof. Attestation data obtained or generated by the hardware platform (e.g., processor, memory, firmware, BIOS) and be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of computing device 110C may be combined before, during, or after being obtained. This may involve determining attestation data for one or more layers of the computing device 110C and the layers may correspond to hardware device layer (e.g., hardware platform attestation data), program layer (e.g, code attestation data), other layer, or a combination thereof.

The program that receives the attestation data may use the attestation data to verify the capabilities of computing device 110C. The program may execute a verification function to verify the computing device 110C in view of the attestation data. The verification function may take as input the attestation data and provide output that indicates whether the computing device 110C is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generate MAC).

Attestation module 412 may perform operations before, during, or after the trusted execution environment 313 is established on computing device 110C. Attestation module 412 may provide attestation data that is specific to the initiation, configuration, or execution of the trusted execution environment 313. In one example, attestation may involve performing a key exchange between the hardware platform of computing device 110C and a remote computing device (e.g., Diffie-Hellman Key Exchange), establish hardware root of trust, and provide measurement and configuration values of trusted execution environment 313 to the remote computing devices 110A-B.

Initiation module 414 may enable computing device 110C to initiate the configuration of trusted execution environment 313 before, during, or after the execution of attestation module 412. Initiation module 414 may execute one or more instructions recognized by the processor (e.g., Intel SGX opcodes, AMD SEV opcodes). The instructions may be called by a program associated with an application, kernel, operating system, hypervisor, bootloader, Basic Input Output Services (BIOS), hardware adapter, other entity, or a combination thereof. In one example, a program that will execute in the trusted execution environment may initiate the creation of the trusted execution environment. In another example, a program may initiate the creation of the trusted execution environment and the trusted execution environment may be used for executing another program. In either example, after the trusted execution environment is initiated it may be configured by configuration module 416.

Configuration module 416 may enable computing device 110C to configure a trusted execution environment to store or execute data of a computing process (e.g., application or virtual machine). Configuration module 416 may configure the trusted execution environment in view of configuration data provided by a process initiating or using the trusted execution environment, by a processor, storage device, other portion of computing device 110, or a combination thereof. The configuration data may be provided as input before, during, or after the trusted execution environment is initiated, created, or updated. As discussed above, a trusted execution environment may include a trusted storage area, a trusted processor area, trusted IO, or a combination thereof and the configuration data may include data for configuring one or more of these. For example, configuration data may include an execution construct data (e.g., processes identifier (PID), virtual machine identifier (VMID)), a storage data (e.g., storage size or location), cryptographic data (e.g., encryption key, decryption key, seed, salt, nonce), other data, or a combination thereof. One or more of these may be configured or customize and associated with the trusted execution environment for the computing process. In one example, the trusted execution environment may include an encrypted storage area and the configuration data may indicate a size of the encrypted storage area that will be allocated to store the computing processes (e.g., size of virtual memory for a trusted storage area).

Configuration module 416 may configure different aspects of the trusted execution environment to use different cryptographic techniques. The different cryptographic techniques may use different cryptographic functions, cryptographic settings, cryptographic keys, cryptographic inputs, other cryptographic data, or a combination thereof. In one example, data of a computing process that will be executed by the trusted execution environment 313 may be encrypted using a first cryptographic technique (e.g., encrypted using a location independent transport key) when loaded by the processor and may be encrypted using a second cryptographic technique (e.g., encrypted using a location dependent storage key) when stored in the encrypted storage area. This may be advantageous because the data may be more vulnerable to attack when it is stored on a removable storage device (e.g., memory module) then when it is transferred over the system bus and therefore different cryptographic techniques may be used.

Data component 420 may enable computing device 110C to load data 322 of a computing process into trusted execution environment 313 to enhance the confidentiality and integrity of the data. Data 322 may include sensitive data 322 (e.g., cryptographic key data), executable data 324 (e.g., machine code, instruction calls, opcodes), non-executable data (e.g., configuration data, parameter values, settings files), other data, or a combination thereof. In one example, data component 420 may include a transfer module 422, a loading module 424, and an execution module 426.

Transfer module 422 may enable computing device 110C to transfer sensitive data 322 into trusted execution environment 313 and between computing devices without exposing the sensitive data 322 to processes running external to trusted execution environment 313. Transfer module 422 may transmit sensitive data 322, received sensitive data 322, or a combination thereof. In one example, transfer module 422 may transfer sensitive data 322 to or from an external device (e.g., remote computing device) that is accessible over an external connection (e.g., network, internet, ethernet, or cellular connection) using a network adapter. The network adapter may write the data directly to memory of computing device 110C (e.g., Direct Memory Access (DMA)) or may provide the data to the processor and the processor may write the data to memory. In another example, transfer module 422 may transfer protected data 322 to or from an internal device (e.g., hard drive) that is accessible over an internal connection (e.g., internal data bus). In either example, sensitive data 322 may be transferred over one or more encrypted communication channels 432A-B.

Encrypted communication channels 432A-B may be security enhanced communication channels that connect trusted execution environment 313 of computing device 110C with a remote computing device. Each of the encrypted communication channels 432A-B may be established by the hardware platform (e.g., processor) and may encrypt the data that is transferred over the encrypted communication channel using hardware based encryption so that the data is accessible to the hardware platform and trusted execution environment 313 without being accessible to any process executed external to the trusted execution environment 313. As such, when a transfer module 422 sends or receives sensitive data 322 it may be accessible to the hardware platform of computing device 110C in a decrypted form without being accessible to the operating system of computing device 110C in the decrypted form (i.e., access to encrypted form or no access at all)

Loading module 424 may include instructions for loading data into trusted execution environment 313. Loading data 322 may involve copying data, moving data, updating data, modifying data, or other action affecting data 322. The process of loading data 322 may involve copying data into the trusted processor area from the trusted storage area, copying data into the trusted storage area from an untrusted area, other copy operation, or a combination thereof. Trusted execution environment 313 may store the data of the computing process in the encrypted storage area and the loading may involve the processor receiving the data in an encrypted form over a bus from the encrypted storage area (e.g., retrieving data via trusted IO). The trusted execution environment 313 may include or be associated with a particular portion of memory (e.g., specific range of addresses) and a particular portion of the processor (e.g, particular core) and the data that is loaded into the trusted execution environment 313 may be accessible to the computing process and inaccessible to the kernel prior to the enabling.

Execution module 426 may enable computing device 110C to cause executable data 324 to execute in the trusted execution environment 313. As discussed in regards to FIG. 2, computing device 110C may include an operating system that manages the execution of multiple computing processes. Execution module 426 may be a part of the operating system or interact with the operating system to initiate the execution of executable data 324 as a computing process. Although the operating system may not have access to a decrypted version of the data in trusted execution environment 313, it may be able to manage when the computing process executes and the operations it performs. The operations executed by the executable data 324 in the trusted execution environments are discussed in more detail in regards to FIG. 4-6.

Figure 5:
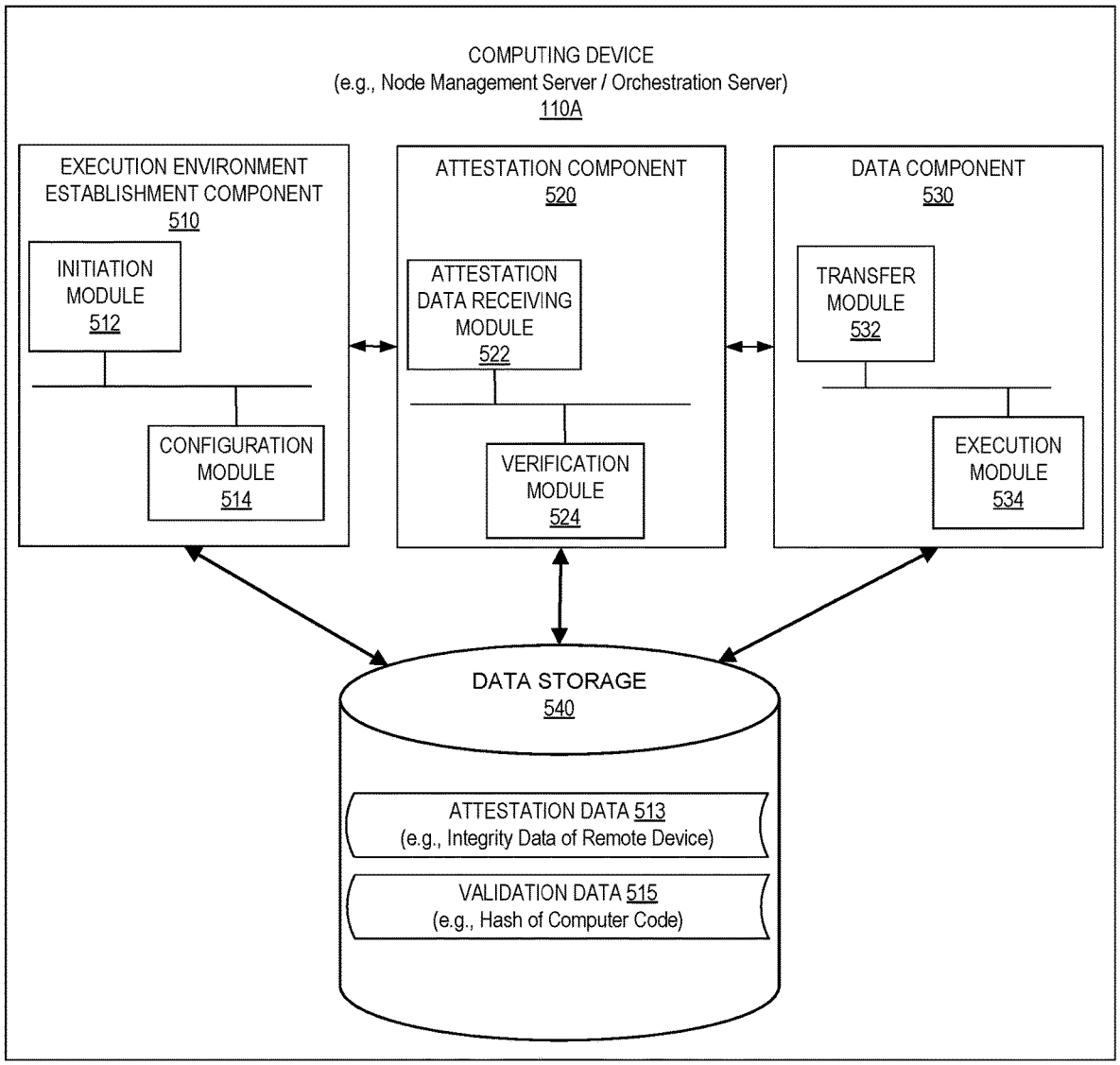
FIG. 5 depicts a block diagram of a computing device that functions as a node management device, in accordance with one or more aspects of the present disclosure.

FIG. 5 depicts a block diagram illustrating an exemplary computing device 110A that is configured to function as a node management device (e.g., orchestration server or provisioning server), in accordance with one or more aspects of the present disclosure. In one example, computing device 110A may initiate the creation of an execution environment (e.g., TEE) on a remote computing device, as discussed below in more details. In another example, the execution environment may be initiated by another computing device and established prior to computing device 110A communicating with the remote computing device. In either example, computing device 110A may perform one or more attestation operations.

The attestation operations may the same or similar to the attestation operations discussed in regards to FIG. 4 and may be used to verify and validate the remote computing device or the execution environment. The attestation operations may be performed before, during, or after providing the remote computing device with access to sensitive data 322. In the example shown in FIG. 5, computing device 110A may include an execution environment establishment component 510, an attestation component 520, and a data component 530. The examples discussed below focus on an execution environment that includes a trusted execution environment (TEE) but the same or similar process may be used to initiate a virtual machine, a container, or a combination thereof.

Execution environment establishment component 510 may enable a node management device (e.g., computing device 110C) to establish one or more execution environments on remote node devices (e.g., computing device 110C-Z). Execution environment establishment component 510 be the same or similar to execution environment establishment component 114A-Z of FIG. 1. Execution environment establishment component 510 may execute on computing device 110A and may communicate with trusted execution establishment component 410 on the remote computing device. Establishing an execution environment may involve creating a new execution environment or updating an existing execution environment. Each of the one or more execution environments may be associated with a set of one or more computing processes and may store and execute data of the set of computing processes. In one example, execution environment establishment component 510 may include an initiation module 512 and a configuration module 514.

Initiation module 512 may enable computing device 110A to initiate the configuration of a trusted execution environment before, during, or after the execution of attestation component 520. Initiation module 512 may transfer a request message to the remote computing device. The request message may be an initiated request message or a configuration request message and may be initiated by a program associated with an application, kernel, operating system, hypervisor, bootloader, Basic Input Output Services (BIOS), hardware adapter, other entity, or a combination thereof. The request message transferred to the remote computing device may cause the hardware platform on the remote computing device to execute one or more instructions to establish the trusted execution environment (e.g., Intel SGX opcodes, AMD SEV opcodes). In one example, the hardware platform of the remote computing device may create the trusted execution environment in response to the request message (e.g., initiation request message). In another example, the hardware platform of the remote computing device may have already created a trusted execution environment and may update the trusted execution environment in view of the request message (e.g., configuration request message). In either example, after the trusted execution environment is created it may be configured by configuration module 514.

Configuration module 514 may enable computing device 110A to configure the trusted execution environment on the remote computing device to store or execute data. Configuration module 514 may configure the trusted execution environment by providing the remote computing device with configuration data for the trusted execution environment. The configuration data may be provided as input before, during, or after the trusted execution environment is initiated, created, or updated. As discussed above, a trusted execution environment may include a trusted storage area, a trusted processor area, trusted IO, or a combination thereof and the configuration data may include data for configuring one or more of these. In one example, the trusted execution environment may include an encrypted storage area and the configuration data may indicate a size of the encrypted storage area that will be allocated to store the data (e.g., size of virtual memory for a trusted storage area).

Attestation component 520 may enable a participant device to perform an attestation to verify the remote computing device before, during, or after the trusted execution environment is established on the remote computing device. Attestation may enable a computer program running on computing device 110A to verify the capabilities of a remote computing device and to detect unauthorized changes to programs, hardware devices, or other portions of the remote computing device. The unauthorized changes may be the result of malicious, defective, or accidental actions by a program or hardware device. The attestation may be performed non-anonymously by disclosing data that uniquely identifies the remote computing device or anonymously without uniquely identifying the remote computing device (e.g., Direct Anonymous Attestation (DAA)). In one example, attestation component 520 may include an attestation data receiving module 522 and a verification module 524.

Attestation data receiving module 522 may enable the participant device to receive attestation data 513 from the remote device that is being verified. Attestation data 513 may be based the configuration of the remote computing device and may represent the capabilities of its hardware platform, trusted execution environment, executable code, or a combination thereof. Attestation data may be received from a program executing on the remote computing device or directly from the hardware platform (e.g., processor, firmware, BIOS) and may be stored in data storage 540 as attestation data 513. Attestation data 513 may be the same or similar to integrity data (e.g., hash or signature of executable code), identification data (e.g., processor model or instance), cryptographic data (e.g., signature keys, endorsement keys, encryption or decryption keys, authentication keys, session keys), measurement data, report data, configuration data, settings data, other data, or a combination thereof. As discussed above, attestation data 513 may be based on attestation data for one or more computing layers of the remote computing device and the computing layers may correspond to a hardware device layer (e.g., hardware platform attestation data), a trusted execution environment layer (e.g., configuration and executable code), operating system layer, other program layer, or a combination thereof. The different layers of attestation data may be combined before, during, or after being received by attestation component 520 and may be referred to as chained attestation data.

Verification module 524 may enable computing device 110A to analyze the attestation data to verify the capabilities of the remote computing device. Verification module 524 may use one or more verification functions that may take as input the attestation data 513 and provide output that indicates whether the remote computing device is verified or unverified. The verification function may generate validation data 515 and analyze the attestation data 513 in view of the validation data 515 to determine if the trusted execution environment of the remote device is valid. This may involve comparing a portion of the attestation data 513 and validation data 515 to see if they match (e.g., hash of TEE matches expected hash). If they match, that may indicate the TEE has not been improperly modified, compromised, or subverted.

Data component 530 may enable the node management device (e.g., computing device 110A) to provide the remote computing device with access to cryptographic key data 116A and provide security enhanced accessed to sensitive data 322. In one example, data component 530 may include a transfer module 532 and an execution module 534.

Transfer module 532 may enable the node management device to transfer cryptographic key data 116A (e.g., client public key) to the remote computing device and sensitive data 322 to the persistent storage device 120. Transfer module 532 may transfer the data using one or more communication channels 132A-Z of FIG. 1 or one or more encrypted communication channels 432A-B as discussed above in regards to FIG. 4.

Execution module 534 may enable the node management device to cause the remote computing device to execute the executable data in the trusted execution environment. As discussed in regards to FIG. 3, the remote computing device (e.g., computing device 110) may include an operating system that manages the execution of multiple computing processes. In one example, execution module 534 may enable the node management device to send an initiation message that initiates and causes the executable data to be executed in the trusted execution environment.

FIGS. 6-9 depict flow diagrams for illustrative examples of methods 600, 700, 800, and 900 for a security enhanced data encryption scheme for persistently storing encrypted data.

Method 600 may be performed by node device that uses the security enhanced method to establish a subsequent copy of the cryptographic key to access the encrypted sensitive data.

Method 700 may be performed by a node management device prior to method 600 and may establish an initial copy of the cryptographic key that is used to encrypt and store the sensitive data. Method 800 and 900 may also be performed by a node management device and may provide one or more node devices with access to the sensitive data by providing the location data of a key establishment service and the asymmetric key data used to establish the subsequent symmetric key. In method 800, the symmetric key established by the node management device may be an encryption key used to encrypt the sensitive data and in method 900 the symmetric key may be a key encryption key that is used to encrypt the encryption key used to encrypt the sensitive data. Methods 600, 700, 800, and 900 may be performed by computing devices that comprise hardware (e.g., circuitry, dedicated logic, programmable logic, microcode, etc.), executable code (such as is run on a general purpose computer system or a dedicated machine), or a combination of both. Methods 600, 700, 800, and 900 and each of their individual functions, routines, subroutines, or operations may be performed by one or more processors of the computing device executing the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 600, 700, 800, and 900 may be performed by one or more of computing devices 110A-Z of FIG. 1.

Figure 6:
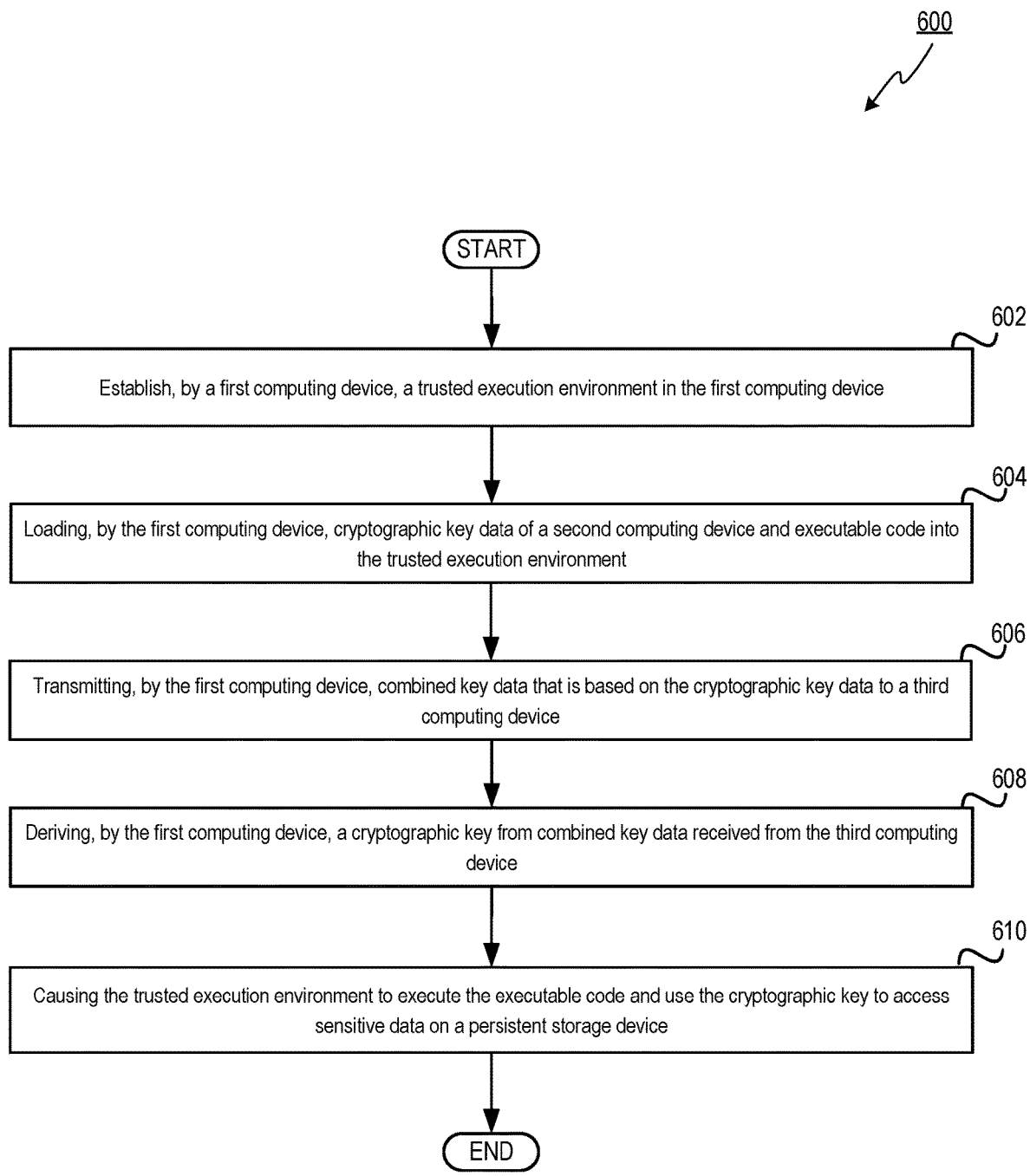
FIG. 6 depicts a flow diagram of a computing device that may function as a node device and derive a subsequent copy of a cryptographic key to access encrypted sensitive data, in accordance with one or more aspects of the present disclosure.

Referring to FIG. 6, method 600 may be performed by a node device that implements the security enhanced technique to establish a subsequent copy of the cryptographic key and uses it to access persistently stored sensitive data. Method 600 may begin at block 602 where a processor of a first computing device may establish a trusted execution environment in the first computing device, wherein the trusted execution environment includes an encrypted memory area. The trusted execution environment may be ephemeral and include non-persistent storage of the first computing device and be absent persistent storage of the first computing device. The trusted execution environment may use the cryptographic key to store or access the sensitive data on the persistent storage device over a network. In one example, establishing the trusted execution environment may involve communicating attestation data between the first computing device and a second computing device.

In one example, the trusted execution environment may include a first trusted execution environment instance (first TEEi) before an interruption and a second trusted execution environment instance (second TEEi) after the interruption. The first TEEi and the second TEEi may both be on the first computing device or may be on different computing devices. The first trusted execution environment instance may derive a first copy of the cryptographic key (e.g., symmetric key for encryption) based on a private key of the second computing device and a public key of the third computing device. The second trusted execution environment instance may derive a second copy of the cryptographic key (e.g., symmetric key for decryption) based on a public key of the second computing device and a private key of the third computing device.

At block 604, the processor of the first computing device may load cryptographic key data of the second computing device and executable code into the trusted execution environment. The cryptographic key data may include asymmetric key data (e.g., client public key) and the executable code may include code for the key establishment client that uses the cryptographic key data to establish the cryptographic key to decrypt the sensitive data. The cryptographic key data and location data be received from the second computing device and the location data may enable the first computing device to communicate with a key establishment service of the third computing device. The first computing device (e.g., prior instantiation of trusted execution environment) or the second computing device (e.g., node management device) may have previously established an initial copy of the cryptographic key and used it to encrypt and store the sensitive data.

Establishing the initial copy of the cryptographic key (e.g., the encryption key) may involve generating an asymmetric key pair (e.g., public and private asymmetric keys) and receiving a public asymmetric key of the third computing device. The first or second computing device may have derived the encryption key in view of the received public asymmetric key and the generated private asymmetric key and used it to encrypt the sensitive data. The encrypted sensitive data may have then been persistently stored on the persistent storage device, which may be a part of the third computing device or a separate persistent storage device on the network. The first or second computing device may transmit the generated public asymmetric key to the second computing device for storage and delete both the encryption key and the generated private asymmetric key without storing them anywhere.

At block 606, the processor of the first computing device may transmit combined key data that is based on the cryptographic key data to the third computing device. In one example, the combined key data may be based on a mathematical combination of cryptographic key data of the first computing device (e.g., ephemeral public key) and the cryptographic key data of the second computing device (e.g., client public key). The cryptographic key data of the second computing device may have been generated by the second computing device or it may have been generated by the first computing device and transmitted to the second computing device. In one example, the first computing device may be a node device and the second computing device may be a node management device. The node management device may derive a first copy of the cryptographic key to use to encrypt the sensitive data and the node device may derive a copy of the cryptographic key to decrypt the sensitive data.

At block 608, the processor of the first computing device may derive the cryptographic key from combined key data received from the third computing device. The combined key data may be based on the cryptographic key data of the second computing device and cryptographic key data of the third computing device. In one example, the cryptographic key may be a symmetric key that is derived based on asymmetric keys stored on different computing devices. The second and third computing devices may provide asymmetric key data used to derive the cryptographic key without storing or providing the cryptographic key.

Deriving the cryptographic key may be performed by the trusted execution environment in the first device and involve generating the cryptographic key used to decrypt the sensitive data (e.g., decryption key). The deriving may involve accessing the cryptographic key data provided by the second computing device (e.g., first public asymmetric key) and obtaining an ephemeral asymmetric key pair (e.g., generating or accessing existing key pair). The ephemeral asymmetric key pair may include a second public asymmetric key and a second private asymmetric key. The trusted execution environment may then generate the first combined key data based on the first and second public asymmetric keys and transmit it to the third computing device. The trusted execution environment may then receive a second combined key data from the third computing device. The second combined key data may be generated by the third computing device based on the first combined key data and a private asymmetric key of the third computing device. The trusted execution environment may then generate the decryption key in view of the received second combined key data by using the second private asymmetric key to separate the second public asymmetric key from the second combined key data.

At block 610, the processor of the first computing device may cause the trusted execution environment to execute the executable code and use the cryptographic key to access sensitive data on a persistent storage device. The sensitive data may be recovery data for the trusted execution environment and may be stored in an encrypted form on the persistent storage device. The recovery data may include executable code (e.g., processor instructions) and state data (e.g., memory or register values). In one example, the cryptographic key may be a symmetric key that is used to encrypt the sensitive data. In another example, the cryptographic key may be a key encryption key (KEK) that is used to encrypt a symmetric key and the symmetric key may be used to encrypt the sensitive data. The encrypted symmetric key may then be provided to the trusted execution environment by the second computing device or the third computing device.

In one example, the cryptographic key may be one of a plurality of symmetric keys of a set. Each of the symmetric keys in the set may be used to encrypt a sensitive data set for a particular computing device and may correspond to a public key. Each of the public keys may be provided to the respective computing device without providing the symmetric key to the respective computing device. The respective computing device (e.g., trusted execution environment in the computing device) may generate its own copy of the symmetric key using the key establishment service of the third device and use it to access its corresponding sensitive data set.

Figure 7:
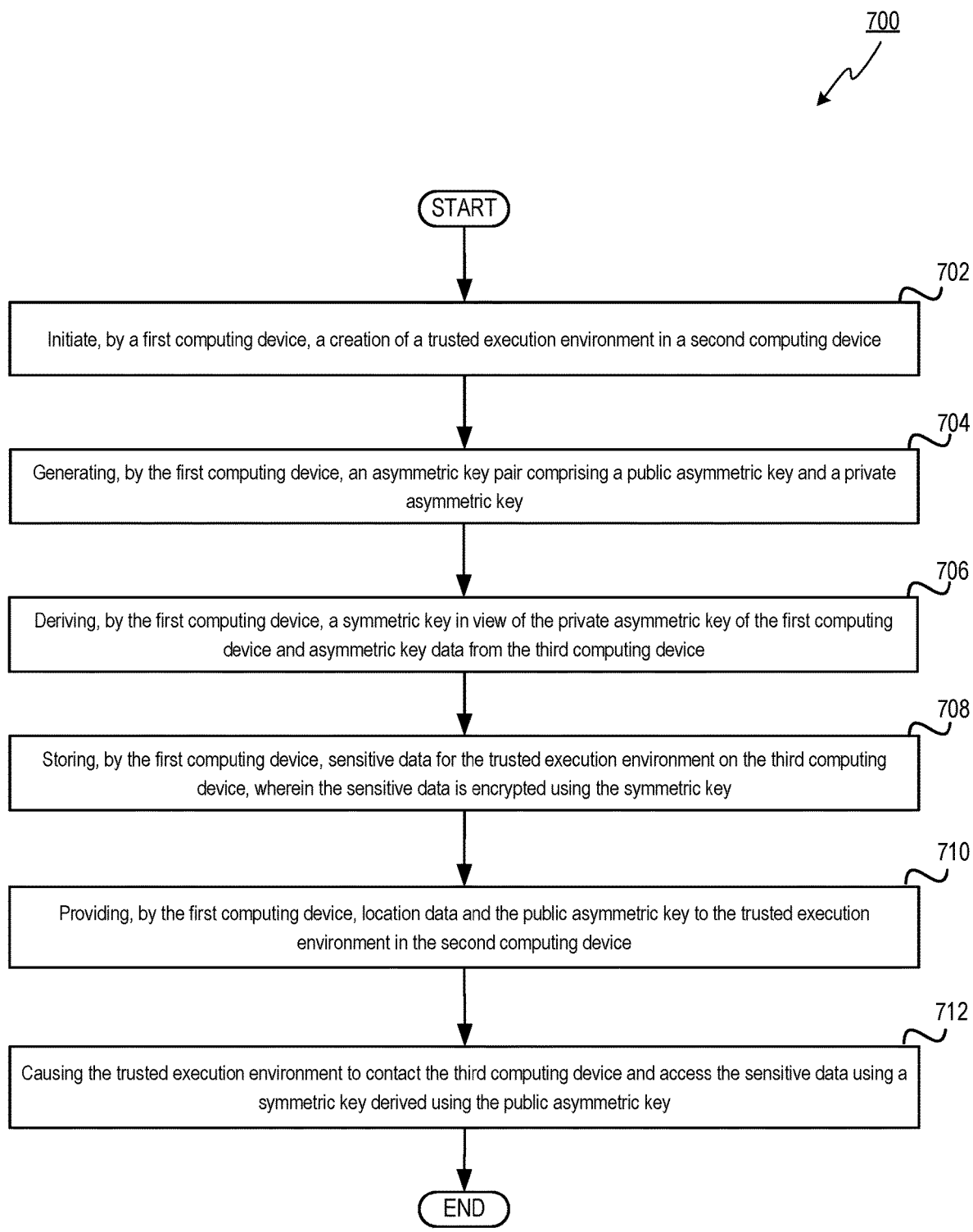
FIG. 7 depicts a flow diagram of a computing device that may function as a node management device and derive an original copy of a cryptographic key to encrypt and persistently store sensitive data, in accordance with one or more aspects of the present disclosure.

Referring to FIG. 7, method 700 may be performed by a processor of a first computing device prior to method 600 and may establish an initial copy of the cryptographic key that is used to encrypt and store the sensitive data. The first computing device of method 700 may be a node management device and may be different from the first computing device of method 600, which may be a node device managed by the node management device. Method 700 may begin at block 702 where the processor of the first computing device may initiate a creation of a trusted execution environment in a second computing device. The trusted execution environment may include an encrypted memory area within main memory of the first computing device. The trusted execution environment may be ephemeral and include non-persistent storage of the first computing device and be absent persistent storage of the first computing device. The trusted execution environment may use the cryptographic key to store or access the sensitive data on the persistent storage device over a network. In one example, the trusted execution environment of the second computing device comprises a first trusted execution environment instance (TEEi) before an interruption and comprises a second trusted execution environment instance after the interruption. The first TEEi and the second TEEi may both be the first computing device or may be on different computing devices.

At block 704, the processor of the first computing device may generate an asymmetric key pair that includes a public asymmetric key and a private asymmetric key. The asymmetric key pair may be generated by a cryptographic key function that is the same or similar to a key generator function (e.g., keygen), a key derivation function (KDF), other cryptographic function, or a combination thereof. In one example, the cryptographic function may include a random number generator (e.g., pseudo-random number generator), which may or may not take data as input (e.g., key length value, base key, seed value, salt value, nonce value, or other input data.

At block 706, the processor of the first computing device may derive a symmetric key in view of the private asymmetric key of the first computing device and asymmetric key data from the third computing device. The third computing device may execute a key establishment service that provides the asymmetric key data of the third device without storing or providing the cryptographic key. Therefore, the symmetric key may be derived in view of asymmetric keys stored on different computing devices (e.g., first computing device and third computing device).

The same symmetric cryptographic key may be derived multiple times by the same or different computing devices. For example, the symmetric key may be established by the first computing device based on a private asymmetric key of the first computing device and a public asymmetric key of the third computing device and may be derived by the second computing device based on a public key of the first computing device and a private key of the third computing device.

At block 708, the processor of the first computing device may store sensitive data for the trusted execution environment on the third computing device. The sensitive data may be encrypted by the first computing device using the symmetric key and may be transmitted over a network to be stored on a persistent storage device that is accessible to the second computing device.

At block 710, the processor of the first computing device may provide location data and the public asymmetric key to the trusted execution environment in the second computing device. The location data may indicate a location of the third computing device and enable the second computing device to communicate with a key establishment service of the third computing device. In one example, both the first computing device and the second computing device may communicate with the same key establishment service. In another example, the first computing device and the second computing device may communicate with different key establishment services on different computing devices (e.g., key establishment services of different networks, data centers, or cloud computing systems).

At block 712, the processor may cause the trusted execution environment to contact the third computing device and access the sensitive data using a symmetric key derived using the public asymmetric key. The sensitive data may include recovery data for the trusted execution environment and may be stored in an encrypted form. The recovery data may include state data (e.g., memory or register values), executable code (e.g., machine code), other data, or a combination thereof. In one example, the symmetric key may be used to encrypt the sensitive data. In another example, the symmetric key may be a key encryption key (KEK) that is used to encrypt a second symmetric key that is used to encrypt the sensitive data. The encrypted second symmetric key may then be provided to the trusted execution environment by the second computing device or the third computing device.

The symmetric key may be one of a plurality of symmetric keys in a set. Each of the symmetric keys of the set may be used to encrypt a sensitive data set for a particular computing device and may correspond to a public key. Each of the public keys may be provided to the respective computing device without providing the symmetric key to the respective computing device. The respective computing device (e.g., trusted execution environment in the computing device) may generate its own copy of the symmetric key using the key establishment service of the third device and use it to access its corresponding sensitive data set.

Figure 8:
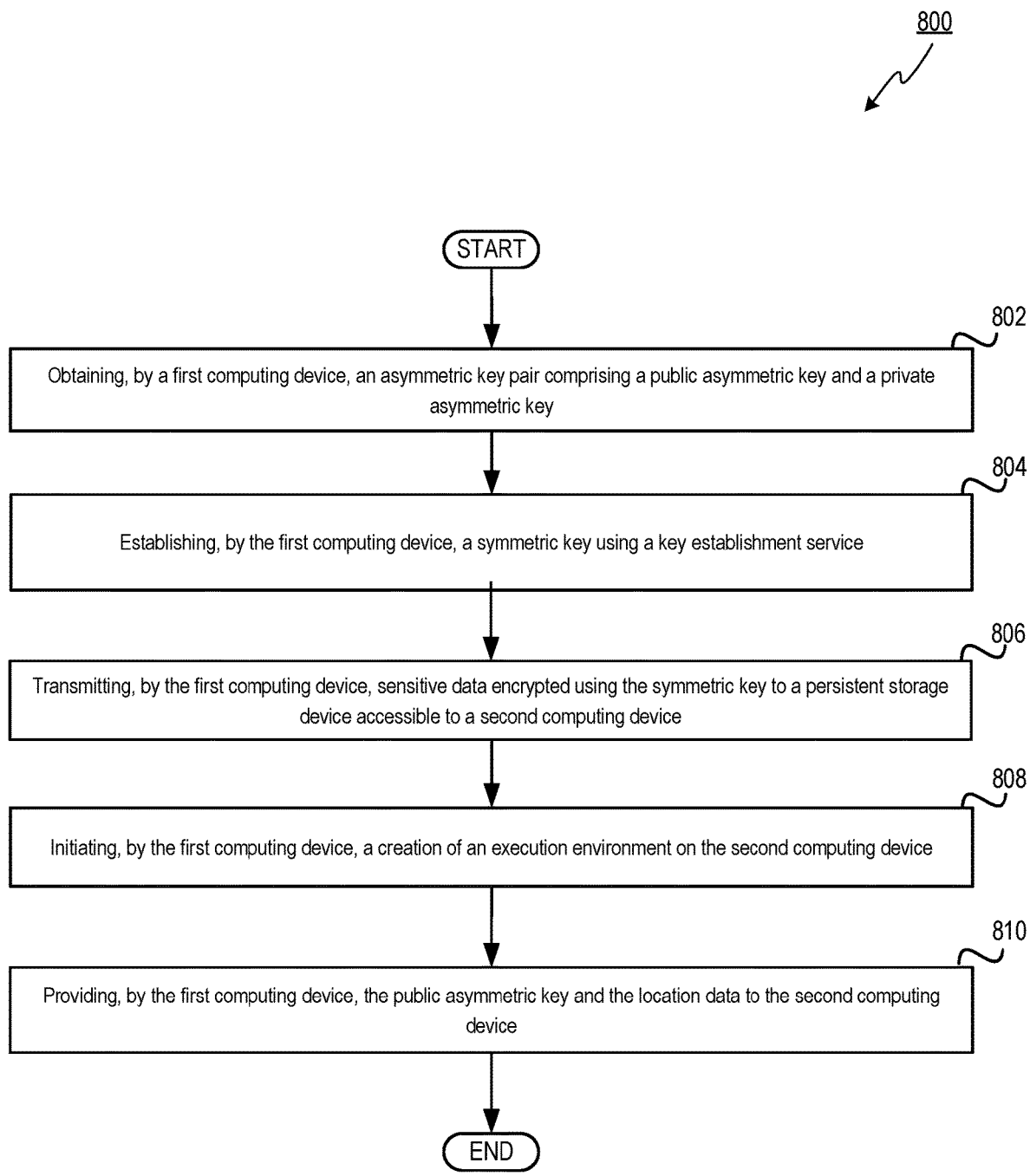
FIG. 8 depicts a flow diagram of a computing device that may function as a node management device and may provision node devices and provide the node devices with data used to access the sensitive data from a persistent storage device, in accordance with one or more aspects of the present disclosure.

Referring to FIG. 8, method 800 be performed by a node management device and may enable one or more node devices to access encrypted sensitive data by providing the one or more node devices with location data of a key establishment service and the asymmetric key data used to establish the cryptographic key (e.g., the decryption key). Method 800 may begin at block 802, the processor of a first computing device may obtain an asymmetric key pair comprising a public asymmetric key and a private asymmetric key. In one example, obtaining the asymmetric key pair may involve generating the asymmetric key pair. In another example, obtaining the asymmetric key pair may involve transmitting a request to another computing device and receiving the asymmetric key pair.

At block 804, the processor of the first computing device may establish the symmetric key using a key establishment service executing on a third computing device. In one example, the first computing device, the second computing device, and the third computing device may each include cryptographic key data used to establish the symmetric key without persistently storing the resulting symmetric key. The symmetric key may be established multiple times using the asymmetric keys of different computing devices. For example, the first computing device may derive a first copy of the symmetric key in view of the private asymmetric key of the first computing device and the public asymmetric key of the third computing device and the same or different computing device may derive a second copy of the same symmetric key in view of the public asymmetric key of the first computing device and the private asymmetric key of the third computing device.

At block 806, the processor of the first computing device may transmit sensitive data encrypted using the symmetric key to a persistent storage device accessible to a second computing device. The process may also delete all instances of the symmetric key and all instances of the private asymmetric key used to establish the symmetric key but may enable the public asymmetric key of the first computing device and the private asymmetric key of the third computing device remain. This may be advantageous because it may restrict the re-establishment of the symmetric key to a device that has possession of the public asymmetric key of the first device and network access to the key establishment service that has the private asymmetric key of the third device.

At block 808, the processor of the first computing device may initiate a creation of an execution environment on the second computing device. The execution environment may be ephemeral and include non-persistent storage of the second computing device without including persistent storage of the second computing device. The execution environment may use the symmetric key to store or access sensitive data on persistent storage of the storage device. In one example, initiating the creation of the execution environment may involve the first computing device initiating on the second computing device a creation of a virtual machine, a container, a trusted execution environment, or a combination thereof. The sensitive data may include configuration data for one or more of the virtual machine, the container, or the trusted execution environment.

At block 810, the processor of the first computing device may provide the public asymmetric key and the location data to the second computing device. The location data may correspond to the key establishment service of the third computing device. In one example, the location data comprises a network address of the key establishment service executing on the third computing device and the key establishment service has access to the a private asymmetric key used to establish the original copy of the symmetric key.

A subsequent copy of the symmetric key may be established by the second computing device. The second computing device may establish the subsequent copy by generating an ephemeral asymmetric key pair with a second public asymmetric key and a second private asymmetric key. The second computing device may then transmit a first combined key data to the key establishment service of the third computing device. The first combined key data may be based on the public asymmetric key provided by the first computing device (e.g., client public key) and the second public asymmetric key (e.g., ephemeral public key). The second computing device may then receive a second combined key data from the key establishment service of the third computing device. The second combined key data may be based on the first combined key data and a private asymmetric key of the third computing device (e.g., client public key, ephemeral public key, and server private key). The second computing device may then derive the symmetric key from the received second combined key data. The deriving may use the second private asymmetric key to separate the second public asymmetric key from the second combined key data.

Figure 9:
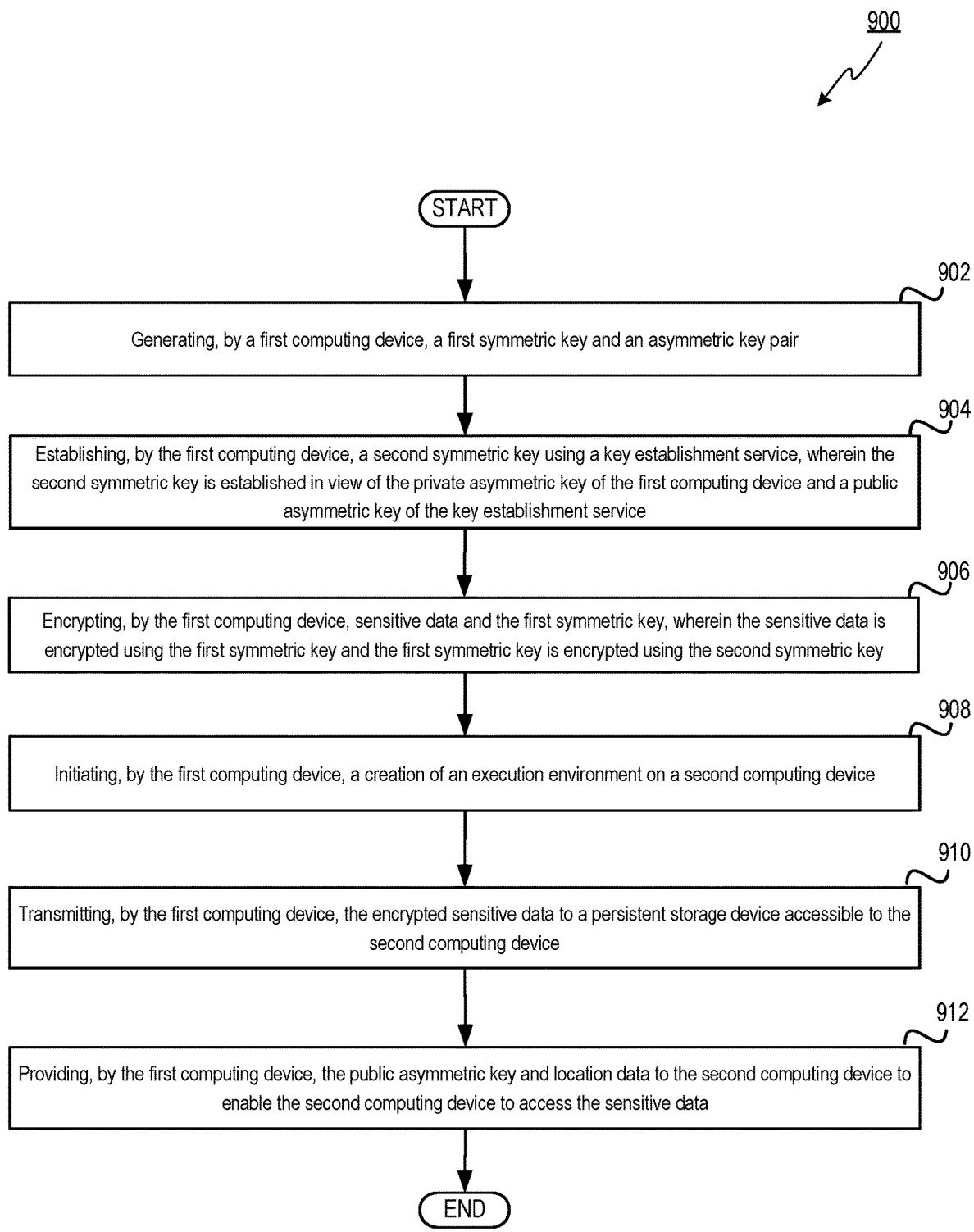
FIG. 9 depicts a flow diagram of a computing device that may function as a node management device that provides a node device with data to establish a key encryption key (KEK) that enables the node device to access sensitive data, in accordance with one or more aspects of the present disclosure.

Referring to FIG. 9, method 900 may be performed by a processor of a computing device that may be moved between physical or logical locations to distribute protected content to a set of computing devices (e.g., set of recipient devices). Method 900 may begin at block 902, the processor of a first computing device may generate a first symmetric key and an asymmetric key pair. The asymmetric key pair may include a public asymmetric key and a private asymmetric key.

At block 904, the processor of the first computing device may establish the second symmetric key using a key establishment service executing on a third computing device. In one example, the first computing device, the second computing device, and the third computing device may each include cryptographic key data used to establish the second symmetric key without persistently storing the second symmetric key. The second symmetric key may be established multiple times using the asymmetric keys of different computing devices. For example, the first computing device may derive a first copy of the second symmetric key in view of the private asymmetric key of the first computing device and the public asymmetric key of the third computing device and the same or different computing device may derive a second copy of the same second symmetric key in view of the public asymmetric key of the first computing device and the private asymmetric key of the third computing device.

At block 906, the processor of the first computing device may encrypt the sensitive data and the first symmetric key. The sensitive data may be encrypted using the first symmetric key (e.g., encryption key) and the first symmetric key may be encrypted using the second symmetric key (e.g., key encryption key).

At block 908, the processor of the first computing device may initiate a creation of an execution environment on the second computing device. The execution environment may be ephemeral and include non-persistent storage of the second computing device without including persistent storage of the second computing device. The execution environment may use the first and second symmetric keys to access sensitive data on persistent storage of the storage device. In one example, initiating the creation of the execution environment may involve the first computing device initiating on the second computing device a creation of a virtual machine, a container, a trusted execution environment, or a combination thereof. The sensitive data may include configuration data for one or more of the virtual machine, the container, or the trusted execution environment.

At block 910, the processor of the first computing device may transmit the encrypted sensitive data to a persistent storage device accessible to a second computing device. The process may also delete all instances of the decrypted version of the first symmetric key, the second symmetric key, and the private asymmetric key used to establish the second symmetric key. But the second computing device may not delete the encrypted first symmetric key or the public asymmetric key of the first computing device. This may be advantageous because it may restrict the re-establishment of the second symmetric key to a device that has possession of the public asymmetric key of the first device and network access to the key establishment service that has the private asymmetric key of the third device.

At block 912, the processor of the first computing device may provide the public asymmetric key and the location data to the second computing device. The location data may correspond to the key establishment service of the third computing device. In one example, the location data comprises a network address of the key establishment service executing on the third computing device and the key establishment service has access to the a private asymmetric key used to establish the original copy of the symmetric key.

Figure 10:
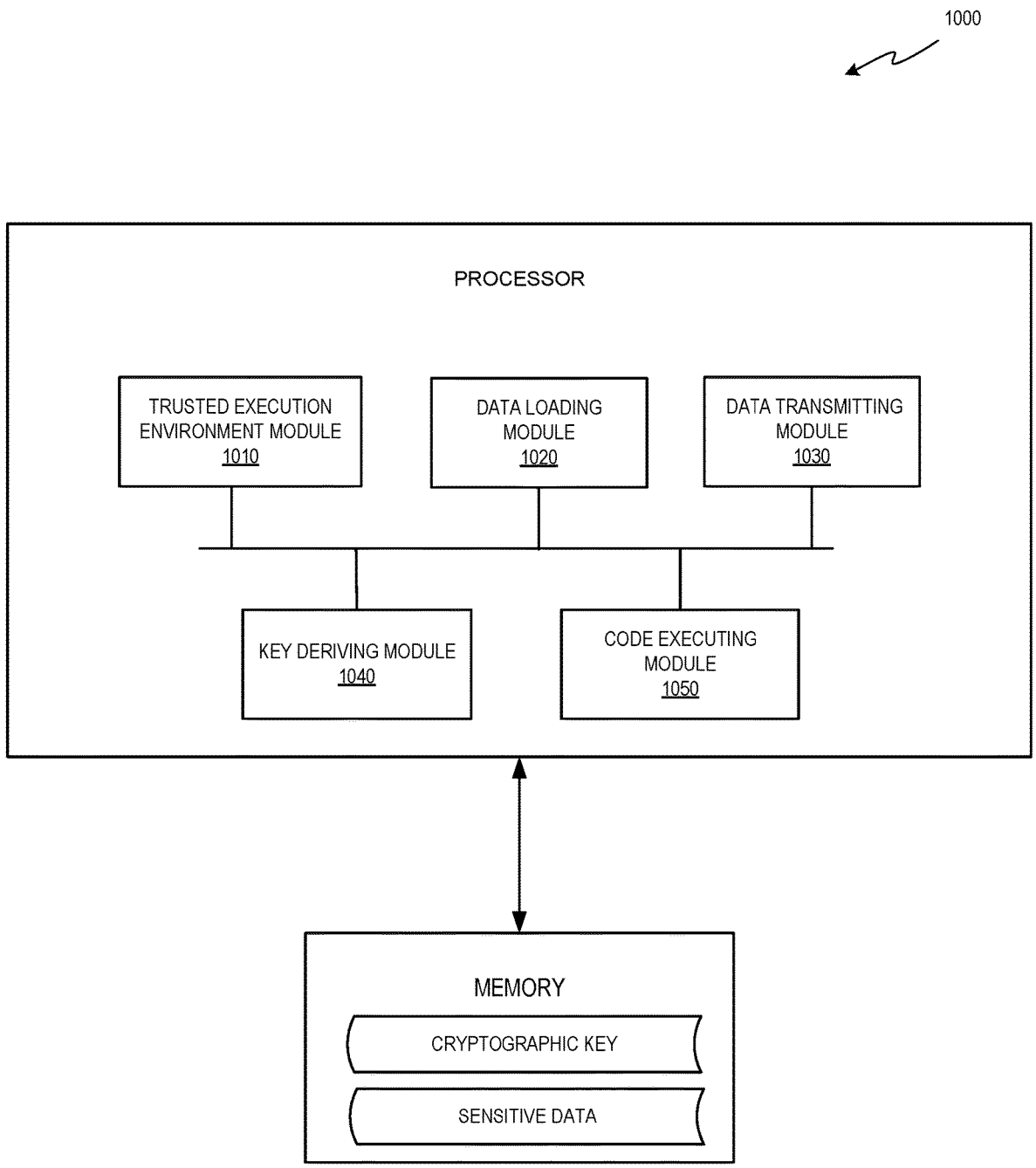
FIG. 10 depicts a block diagram of an example computer system operating in accordance with the examples of the present disclosure.

FIG. 10 depicts a block diagram of a computer system 1000 operating in accordance with one or more aspects of the present disclosure. Computer system 1000 may be the same or similar to computing device 110A discussed above, and may include one or more processors and one or more memory devices. In the example shown, computer system 1000 may include a trusted execution environment module 1010, a data loading module 1020, a data transmitting module 1030, a key deriving module 1040, and a code executing module 1050.

Trusted execution environment module 1010 may enable a processor of a first computing device to establish a trusted execution environment in the first computing device, wherein the trusted execution environment includes an encrypted memory area. The trusted execution environment may be ephemeral and include non-persistent storage of the first computing device and be absent persistent storage of the first computing device. The trusted execution environment may use the cryptographic key to store or access the sensitive data on the persistent storage device over a network. In one example, establishing the trusted execution environment may involve communicating attestation data between the first computing device and a second computing device.

In one example, the trusted execution environment may include a first trusted execution environment instance (first TEEi) before an interruption and a second trusted execution environment instance (second TEEi) after the interruption. The first TEEi and the second TEEi may both be on the first computing device or may be on different computing devices. The first trusted execution environment instance may derive a first copy of the cryptographic key (e.g., symmetric key for encryption) based on a private key of the second computing device and a public key of the third computing device. The second trusted execution environment instance may derive a second copy of the cryptographic key (e.g., symmetric key for decryption) based on a public key of the second computing device and a private key of the third computing device.

Data loading module 1020 may enable the processor of the first computing device to load cryptographic key data of the second computing device and executable code into the trusted execution environment. The cryptographic key data may include asymmetric key data (e.g., client public key) and the executable code may include code for the key establishment client that uses the cryptographic key data to establish the cryptographic key to decrypt the sensitive data. The cryptographic key data and location data be received from the second computing device and the location data may enable the first computing device to communicate with a key establishment service of the third computing device. The first computing device (e.g., prior instantiation of trusted execution environment) or the second computing device (e.g., node management device) may have previously established an initial copy of the cryptographic key and used it to encrypt and store the sensitive data.

Establishing the initial copy of the cryptographic key (e.g., the encryption key) may involve generating an asymmetric key pair (e.g., public and private asymmetric keys) and receiving a public asymmetric key of the third computing device. The first or second computing device may have derived the encryption key in view of the received public asymmetric key and the generated private asymmetric key and used it to encrypt the sensitive data. The encrypted sensitive data may have then been persistently stored on the persistent storage device, which may be a part of the third computing device or a separate persistent storage device on the network. The first or second computing device may transmit the generated public asymmetric key to the second computing device for storage and delete both the encryption key and the generated private asymmetric key without storing them anywhere.

Data transmitting module 1030 may enable the processor of the first computing device to transmit combined key data that is based on the cryptographic key data to the third computing device. In one example, the combined key data may be based on a mathematical combination of cryptographic key data of the first computing device (e.g., ephemeral public key) and the cryptographic key data of the second computing device (e.g., client public key). The cryptographic key data of the second computing device may have been generated by the second computing device or it may have been generated by the first computing device and transmitted to the second computing device. In one example, the first computing device may be a node device and the second computing device may be a node management device. The node management device may derive a first copy of the cryptographic key to use to encrypt the sensitive data and the node device may derive a copy of the cryptographic key to decrypt the sensitive data.

Key deriving module 1040 may enable the processor of the first computing device to derive the cryptographic key from combined key data received from the third computing device. The combined key data may be based on the cryptographic key data of the second computing device and cryptographic key data of the third computing device. In one example, the cryptographic key may be a symmetric key that is derived based on asymmetric keys stored on different computing devices. The second and third computing devices may provide asymmetric key data used to derive the cryptographic key without storing or providing the cryptographic key.

Deriving the cryptographic key may be performed by the trusted execution environment in the first device and involve generating the cryptographic key used to decrypt the sensitive data (e.g., decryption key). The deriving may involve accessing the cryptographic key data provided by the second computing device (e.g., first public asymmetric key) and obtaining an ephemeral asymmetric key pair (e.g., generating or accessing existing key pair). The ephemeral asymmetric key pair may include a second public asymmetric key and a second private asymmetric key. The trusted execution environment may then generate the first combined key data based on the first and second public asymmetric keys and transmit it to the third computing device. The trusted execution environment may then receive a second combined key data from the third computing device. The second combined key data may be generated by the third computing device based on the first combined key data and a private asymmetric key of the third computing device. The trusted execution environment may then generate the decryption key in view of the received second combined key data by using the second private asymmetric key to separate the second public asymmetric key from the second combined key data.

Code executing module 1050 may enable the processor of the first computing device to cause the trusted execution environment to execute the executable code and use the cryptographic key to access sensitive data on a persistent storage device. The sensitive data may be recovery data for the trusted execution environment and may be stored in an encrypted form on the persistent storage device. The recovery data may include executable code (e.g., processor instructions) and state data (e.g., memory or register values). In one example, the cryptographic key may be a symmetric key that is used to encrypt the sensitive data. In another example, the cryptographic key may be a key encryption key (KEK) that is used to encrypt a symmetric key and the symmetric key may be used to encrypt the sensitive data. The encrypted symmetric key may then be provided to the trusted execution environment by the second computing device or the third computing device.

In one example, the cryptographic key may be one of a plurality of symmetric keys of a set. Each of the symmetric keys in the set may be used to encrypt a sensitive data set for a particular computing device and may correspond to a public key. Each of the public keys may be provided to the respective computing device without providing the symmetric key to the respective computing device. The respective computing device (e.g., trusted execution environment in the computing device) may generate its own copy of the symmetric key using the key establishment service of the third device and use it to access its corresponding sensitive data set.

Figure 11:
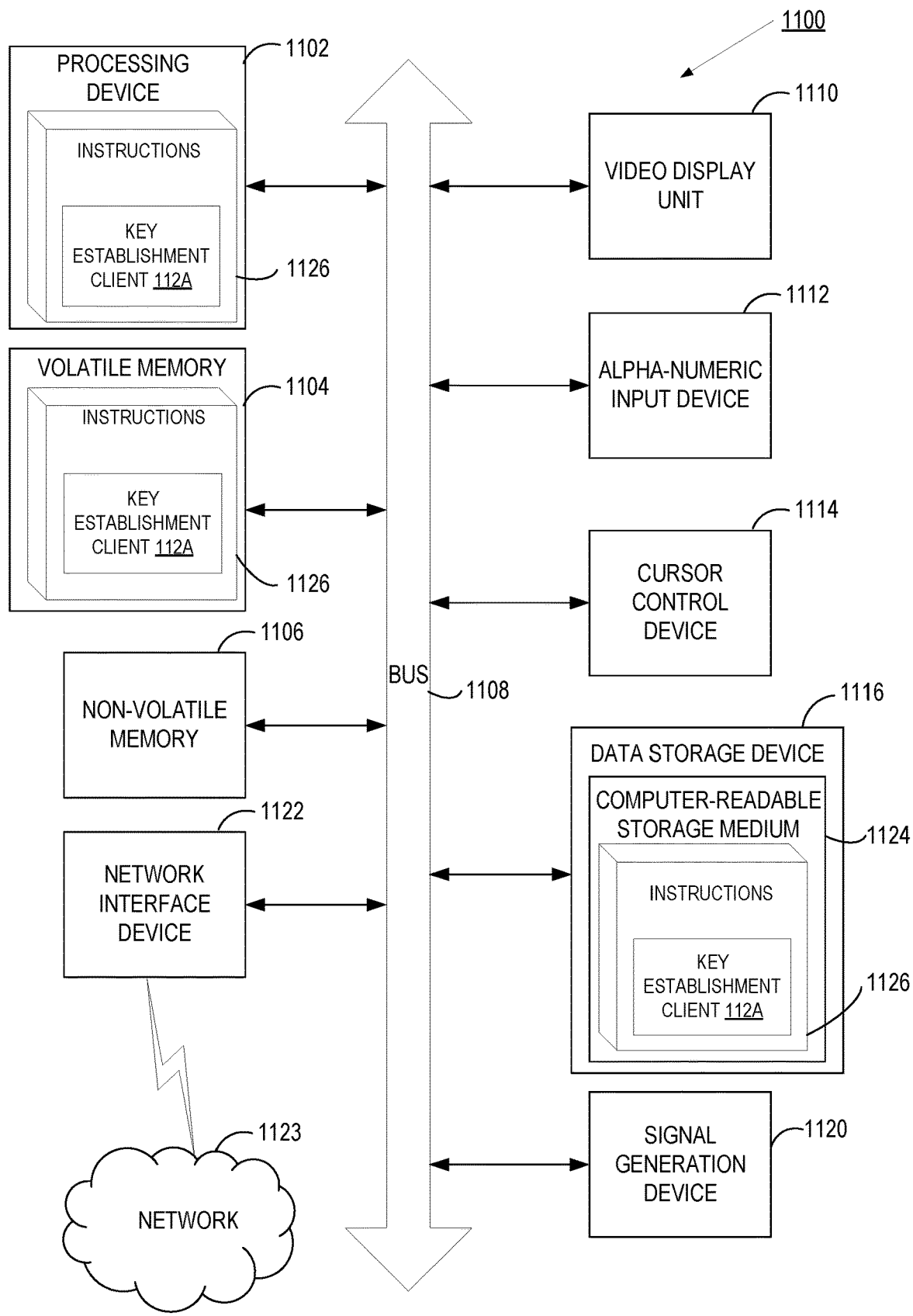
FIG. 11 depicts a block diagram of another example computing system operating in accordance with the examples of the present disclosure.

FIG. 11 depicts a block diagram of a computer system operating in accordance with one or more aspects of the present disclosure. In various illustrative examples, computer system 1100 may correspond to computing device 110A-Z. Computer system 1100 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 1100 may be connected (e.g., via a network, such as a Local Area Network (LAN), an intranet, an extranet, or the Internet) to other computer systems. Computer system 1100 may operate in the capacity of a server or a client computer in a client-server environment, or as a peer computer in a peer-to-peer or distributed network environment. Computer system 1100 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1100 may include a processing device 1102, a volatile memory 1104 (e.g., random access memory (RAM)), a non-volatile memory 1106 (e.g., read-only memory (ROM) or electrically-erasable programmable ROM (EEPROM)), and a data storage device 1116, which may communicate with each other via a bus 1108.

Processing device 1102 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1100 may further include a network interface device 1122 connected to network 1123. Computer system 1100 also may include a video display unit 1110 (e.g., an LCD), an alphanumeric input device 1112 (e.g., a keyboard), a cursor control device 1114 (e.g., a mouse), and a signal generation device 1120.

Data storage device 1116 may include a non-transitory computer-readable storage medium 1124 on which may store instructions 1126 encoding any one or more of the methods or functions described herein, including instructions for implementing method 600, 700, 800 and 900.

Instructions 1126 may also reside, completely or partially, within volatile memory 1104 and/or within processing device 1102 during execution thereof by computer system 1100, hence, volatile memory 1104 and processing device 1102 may also constitute machine-readable storage media.

While computer-readable storage medium 1124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: establishing, by a first computing device, a trusted execution environment in the first computing device, wherein the trusted execution environment comprises an encrypted memory area; loading, by the first computing device, cryptographic key data of a second computing device and executable code into the trusted execution environment; transmitting, by the first computing device, combined key data that is based on the cryptographic key data to a third computing device; deriving, by the first computing device, a cryptographic key from combined key data received from the third computing device, wherein the received combined key data is based on the cryptographic key data of the second computing device and cryptographic key data of the third computing device; and causing the trusted execution environment to execute the executable code and use the cryptographic key to access sensitive data on a persistent storage device.

Example 2 is a method of example 1, wherein the trusted execution environment is ephemeral and comprises non-persistent storage of the first computing device, and wherein the trusted execution environment uses the cryptographic key to access the sensitive data over a network from the persistent storage device.

Example 3 is a method of example 1, wherein the cryptographic key is a symmetric key that is derived based on asymmetric keys stored on different computing devices, and wherein the third computing device comprises a key establishment service that provides the combined key data used to derive the cryptographic key without storing or providing the cryptographic key.

Example 4 is a method of example 1, wherein the sensitive data comprises recovery data for the trusted execution environment and is stored in an encrypted form, wherein the recovery data comprises executable code and state data.

Example 5 is a method of example 1, wherein the trusted execution environment comprises a first trusted execution environment instance (TEEi) before an interruption and comprises a second trusted execution environment instance after the interruption, wherein the first TEEi and the second TEEi are on the first computing device or are on different computing devices.

Example 6 is a method of example 5, wherein the cryptographic key is a symmetric key and wherein the first trusted execution environment instance derives the symmetric key based on a private asymmetric key of the second computing device and a public asymmetric key of the third computing device, and wherein the second trusted execution environment instance derives the symmetric key based on a public asymmetric key of the second computing device and a private asymmetric key of the third computing device.

Example 7 is a method of example 1, wherein the first computing device comprises a node device that is managed by the second computing device, and wherein the second computing device derives a copy of the cryptographic key to use to encrypt the sensitive data and the first computing device derives a copy of the cryptographic key to decrypt the sensitive data.

Example 8 is a method of example 1, further comprising establishing an encryption key and storing the sensitive data, wherein the establishing and the storing comprises: generating, by the trusted execution environment, an asymmetric key pair comprising a public asymmetric key and a private asymmetric key; receiving, by the trusted execution environment, a public asymmetric key of the third computing device; deriving, by the trusted execution environment, the encryption key in view of the received public asymmetric key and the generated private asymmetric key; encrypting the sensitive data using the encryption key; persistently storing the encrypted sensitive data on the persistent storage device of the third computing device; transmitting the generated public asymmetric key to the second computing device; and deleting the encryption key and the generated private asymmetric key.

Example 9 is a method of example 1, wherein deriving the cryptographic key comprises deriving a decryption key to decrypt the sensitive data, wherein the deriving of the decryption key comprises: accessing, by the trusted execution environment, the cryptographic key data of the second computing device that comprises a first public asymmetric key; obtaining, by the trusted execution environment, an ephemeral asymmetric key pair comprising a second public asymmetric key and a second private asymmetric key; generating the combined key data that is transmitted to the third computing device, wherein the combined key data comprises a first combined key data that is based on the first public asymmetric key and the second public asymmetric key; receiving a second combined key data from the third computing device, wherein the second combined key data is based on the first combined key data and a private asymmetric key of the third computing device; and generating, by the trusted execution environment, the decryption key in view of the received second combined key data, wherein generating the decryption key uses the second private asymmetric key to separate the second public asymmetric key from the second combined key data.

Example 10 is a method of example 1, further comprising: deriving, by the trusted execution environment, a set of symmetric keys, wherein each symmetric key of the set corresponds to a public asymmetric key and is used to encrypt sensitive data for a particular computing device; and providing, by the trusted execution environment, the public asymmetric key to the particular computing device without providing the symmetric key to the particular computing device.

Example 11 is a method of example 1, wherein the cryptographic key comprises a symmetric key that was used to encrypt the sensitive data.

Example 12 is a method of example 1, wherein the cryptographic key comprises a key encryption key (KEK) that was used to encrypt a symmetric key and the symmetric key is used to encrypt the sensitive data, and wherein the encrypted symmetric key is provided to the trusted execution environment from the second computing device or the third computing device.

Example 13 is a method of example 1, further comprising, receiving, by the first computing device, the cryptographic key data and location data from the second computing device, wherein the location data enables the first computing device to communicate with a key establishment service of the third computing device.

Example 14 is a method of example 1, wherein the cryptographic key data of the second computing device is generated by the second computing device or is generated by the first computing device and stored by the second computing device.

Example 15 is a system comprising: a memory; and a processing device of a first computing device communicably coupled to the memory, the processing device to: establish a trusted execution environment in the first computing device, wherein the trusted execution environment comprises an encrypted memory area; load cryptographic key data of a second computing device and executable code into the trusted execution environment; transmit combined key data that is based on the cryptographic key data to a third computing device; derive a cryptographic key from combined key data received from the third computing device, wherein the received combined key data is based on the cryptographic key data of the second computing device and cryptographic key data of the third computing device; and cause the trusted execution environment to execute the executable code and use the cryptographic key to access sensitive data on a persistent storage device.

Example 16 is a system of example 15, wherein the trusted execution environment is ephemeral and comprises non-persistent storage of the first computing device, and wherein the trusted execution environment uses the cryptographic key to access the sensitive data over a network from the persistent storage device.

Example 17 is a system of example 15, wherein the cryptographic key is a symmetric key that is derived based on asymmetric keys stored on different computing devices, and wherein the third computing device comprises a key establishment service that provides the combined key data used to derive the cryptographic key without storing or providing the cryptographic key.

Example 18 is a system of example 15, wherein the sensitive data comprises recovery data for the trusted execution environment and is stored in an encrypted form, wherein the recovery data comprises executable code and state data.

Example 19 is a non-transitory machine-readable storage medium storing instructions which, when executed, cause a processing device to perform operations comprising: initiating, by a first computing device, a creation of a trusted execution environment in a second computing device, wherein the trusted execution environment comprises an encrypted memory area; generating, by the first computing device, an asymmetric key pair comprising a public asymmetric key and a private asymmetric key; deriving, by the first computing device, a symmetric key in view of the private asymmetric key of the first computing device and asymmetric key data from the third computing device; storing, by the first computing device, sensitive data for the trusted execution environment on the third computing device, wherein the sensitive data is encrypted using the symmetric key; providing, by the first computing device, location data and the public asymmetric key to the trusted execution environment in the second computing device, wherein the location data indicates a location of the third computing device; and causing the trusted execution environment to contact the third computing device and access the sensitive data using a symmetric key derived using the public asymmetric key.

Example 20 is a non-transitory machine-readable storage medium of example 19, wherein the trusted execution environment comprises a first trusted execution environment instance (TEEi) before an interruption and comprises a second trusted execution environment instance after the interruption, wherein the first TEEi stores the sensitive data on the third computing device and the second TEEi retrieves the sensitive data from the third computing device.

Example 21 is a method comprising: establishing, by a node device, a trusted execution environment in the node device, wherein the trusted execution environment comprises an encrypted memory area; loading, by the node device, cryptographic key data of a node management device and executable code into the trusted execution environment; transmitting, by the node device, combined key data that is based on the cryptographic key data to a key establishment service; deriving, by the node device, a cryptographic key from combined key data received from the key establishment service, wherein the received combined key data is based on the cryptographic key data of the node management device and cryptographic key data of the key establishment service; and causing the trusted execution environment to execute the executable code and use the cryptographic key to access sensitive data on a persistent storage device.

Example 22 is a method of example 21, wherein the trusted execution environment is ephemeral and comprises non-persistent storage of the node device, and wherein the trusted execution environment uses the cryptographic key to access the sensitive data over a network from the persistent storage device.

Example 23 is a method of example 21, wherein the cryptographic key is a symmetric key that is derived based on asymmetric keys stored on different computing devices, and wherein the key establishment service executes on a server device and provides the combined key data used to derive the cryptographic key without storing or providing the cryptographic key.

Example 24 is a method of example 21, wherein the sensitive data comprises recovery data for the trusted execution environment and is stored in an encrypted form, wherein the recovery data comprises executable code and state data.

Example 25 is a method of example 21, wherein the trusted execution environment comprises a first trusted execution environment instance (TEEi) before an interruption and comprises a second trusted execution environment instance after the interruption, wherein the first TEEi and the second TEEi are on the node device.

Example 26 is a method of example 25, wherein the cryptographic key is a symmetric key and wherein the first trusted execution environment instance derives the symmetric key based on a private asymmetric key of the node management device and a public asymmetric key of the key establishment service, and wherein the second trusted execution environment instance derives the symmetric key based on a public asymmetric key of the node management device and a private asymmetric key of the key establishment service.

Example 27 is a method of example 21, wherein the node device is managed by the node management device, and wherein the node management device derives a copy of the cryptographic key to use to encrypt the sensitive data and the node device derives a copy of the cryptographic key to decrypt the sensitive data.

Example 28 is a method of example 21, further comprising establishing an encryption key and storing the sensitive data, wherein the establishing and the storing comprises: generating, by the trusted execution environment, an asymmetric key pair comprising a public asymmetric key and a private asymmetric key; receiving, by the trusted execution environment, a public asymmetric key of the key establishment service; deriving, by the trusted execution environment, the encryption key in view of the received public asymmetric key and the generated private asymmetric key; encrypting the sensitive data using the encryption key; persistently storing the encrypted sensitive data on the persistent storage device; transmitting the generated public asymmetric key to the node management device; and deleting the encryption key and the generated private asymmetric key.

Example 29 is a method of example 21, wherein deriving the cryptographic key comprises deriving a decryption key to decrypt the sensitive data, wherein the deriving of the decryption key comprises: accessing, by the trusted execution environment, the cryptographic key data of the node management device that comprises a first public asymmetric key; obtaining, by the trusted execution environment, an ephemeral asymmetric key pair comprising a second public asymmetric key and a second private asymmetric key; generating the combined key data that is transmitted to the key establishment service, wherein the combined key data comprises a first combined key data that is based on the first public asymmetric key and the second public asymmetric key; receiving a second combined key data from the key establishment service, wherein the second combined key data is based on the first combined key data and a private asymmetric key of the key establishment service; and generating, by the trusted execution environment, the decryption key in view of the received second combined key data, wherein generating the decryption key uses the second private asymmetric key to separate the second public asymmetric key from the second combined key data.

Example 30 is an apparatus comprising: a means for establishing, by a first computing device, a trusted execution environment in the first computing device, wherein the trusted execution environment comprises an encrypted memory area; a means for loading, by the first computing device, cryptographic key data of a second computing device and executable code into the trusted execution environment; a means for transmitting, by the first computing device, combined key data that is based on the cryptographic key data to a third computing device; a means for deriving, by the first computing device, a cryptographic key from combined key data received from the third computing device, wherein the received combined key data is based on the cryptographic key data of the second computing device and cryptographic key data of the third computing device; and a means for causing the trusted execution environment to execute the executable code and use the cryptographic key to access sensitive data on a persistent storage device.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "loading," "causing," "performing," "executing," "configuring," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 600, 700, 800, or 900 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
transmitting, by a first computing device comprising a trusted execution environment, combined key data that is based on cryptographic key data of a second computing device, the combined data being transmitted to a third computing device;
deriving, by the first computing device, a cryptographic key from combined key data received from the third computing device, wherein the received combined key data is based on the cryptographic key data of the second computing device and cryptographic key data of the third computing device; and
causing the trusted execution environment to use the cryptographic key to access sensitive data on a persistent storage device.

2. The method of claim 1, wherein the trusted execution environment is ephemeral and comprises non-persistent storage of the first computing device, and wherein the trusted execution environment uses the cryptographic key to access the sensitive data over a network from the persistent storage device.

3. The method of claim 1, wherein the cryptographic key is a symmetric key that is derived based on asymmetric keys stored on different computing devices, and wherein the third computing device comprises a key establishment service that provides the combined key data used to derive the cryptographic key without storing or providing the cryptographic key.

4. The method of claim 1, wherein the sensitive data comprises recovery data for the trusted execution environment and is stored in an encrypted form, wherein the recovery data comprises executable code and state data.

5. The method of claim 1, wherein the trusted execution environment comprises a first trusted execution environment instance (TEEi) before an interruption and comprises a second trusted execution environment instance after the interruption, wherein the first TEEi and the second TEEi are on the first computing device or are on different computing devices.

6. The method of claim 5, wherein the cryptographic key is a symmetric key and wherein the first trusted execution environment instance derives the symmetric key based on a private asymmetric key of the second computing device and a public asymmetric key of the third computing device, and wherein the second trusted execution environment instance derives the symmetric key based on a public asymmetric key of the second computing device and a private asymmetric key of the third computing device.

7. The method of claim 1, wherein the first computing device comprises a node device that is managed by the second computing device, and wherein the second computing device derives a copy of the cryptographic key to use to encrypt the sensitive data and the first computing device derives a copy of the cryptographic key to decrypt the sensitive data.

8. The method of claim 1, further comprising establishing an encryption key and storing the sensitive data, wherein the establishing and the storing comprises:

generating, by the trusted execution environment, an asymmetric key pair comprising a public asymmetric key and a private asymmetric key;
receiving, by the trusted execution environment, a public asymmetric key of the third computing device;
deriving, by the trusted execution environment, the encryption key in view of the received public asymmetric key and the generated private asymmetric key;
encrypting the sensitive data using the encryption key;
persistently storing the encrypted sensitive data on the persistent storage device of the third computing device;
transmitting the generated public asymmetric key to the second computing device; and
deleting the encryption key and the generated private asymmetric key.

9. The method of claim 1, wherein deriving the cryptographic key comprises deriving a decryption key to decrypt the sensitive data, wherein the deriving of the decryption key comprises:
accessing, by the trusted execution environment, the cryptographic key data of the second computing device that comprises a first public asymmetric key;
obtaining, by the trusted execution environment, an ephemeral asymmetric key pair comprising a second public asymmetric key and a second private asymmetric key;
generating the combined key data that is transmitted to the third computing device, wherein the combined key data comprises a first combined key data that is based on the first public asymmetric key and the second public asymmetric key;
receiving a second combined key data from the third computing device, wherein the second combined key data is based on the first combined key data and a private asymmetric key of the third computing device; and
generating, by the trusted execution environment, the decryption key in view of the received second combined key data, wherein generating the decryption key uses the second private asymmetric key to separate the second public asymmetric key from the second combined key data.

10. The method of claim 1, further comprising:
deriving, by the trusted execution environment, a set of symmetric keys, wherein each symmetric key of the set corresponds to a public asymmetric key and is used to encrypt sensitive data for a particular computing device; and
providing, by the trusted execution environment, the public asymmetric key to the particular computing device without providing the symmetric key to the particular computing device.

11. The method of claim 1, wherein the cryptographic key comprises a symmetric key that was used to encrypt the sensitive data.

12. The method of claim 1, wherein the cryptographic key comprises a key encryption key (KEK) that was used to encrypt a symmetric key and the symmetric key is used to encrypt the sensitive data, and wherein the encrypted symmetric key is provided to the trusted execution environment from the second computing device or the third computing device.

13. The method of claim 1, further comprising, receiving, by the first computing device, the cryptographic key data and location data from the second computing device, wherein the location data enables the first computing device to communicate with a key establishment service of the third computing device.

14. The method of claim 1, wherein the cryptographic key data of the second computing device is generated by the second computing device or is generated by the first computing device and stored by the second computing device.

15. A non-transitory machine-readable storage medium storing instructions which, when executed, cause a processing device to perform operations comprising:
   transmitting, by a first computing device comprising a trusted execution environment, combined key data that is based on cryptographic key data of a second computing device, the combined data being transmitted to a third computing device;
   deriving, by the first computing device, a cryptographic key from combined key data received from the third computing device, wherein the received combined key data is based on the cryptographic key data of the second computing device and cryptographic key data of the third computing device; and
   causing the trusted execution environment to use the cryptographic key to access sensitive data on a persistent storage device.

16. The non-transitory machine-readable storage medium of claim 15, wherein the trusted execution environment is ephemeral and comprises non-persistent storage of the first computing device, and wherein the trusted execution environment uses the cryptographic key to access the sensitive data over a network from the persistent storage device.

17. The non-transitory machine-readable storage medium of claim 15, wherein the cryptographic key is a symmetric key that is derived based on asymmetric keys stored on different computing devices, and wherein the third computing device comprises a key establishment service that provides the combined key data used to derive the cryptographic key without storing or providing the cryptographic key.

18. The non-transitory machine-readable storage medium of claim 15, wherein the sensitive data comprises recovery data for the trusted execution environment and is stored in an encrypted form, wherein the recovery data comprises executable code and state data.

19. A system comprising:
   a memory; and
   a processing device, coupled to the memory, to perform operations comprising:
      initiating, by a first computing device, a creation of a trusted execution environment in a second computing device, wherein the trusted execution environment comprises an encrypted memory area;
      generating, by a first computing device, an asymmetric key pair comprising a public asymmetric key and a private asymmetric key;
      deriving, by the first computing device, a symmetric key in view of the private asymmetric key of the first computing device and asymmetric key data from a second computing device;
      storing, by the first computing device, sensitive data for a trusted execution environment in a third computing device on the second computing device, wherein the sensitive data is encrypted using the symmetric key; and
      providing, by the first computing device, location data and the public asymmetric key to the trusted execution environment in the third computing device to cause the trusted execution environment to contact the second computing device and access the sensitive data.

20. The system of claim 19, wherein the trusted execution environment comprises a first trusted execution environment instance (TEEi) before an interruption and comprises a second trusted execution environment instance after the interruption, wherein the first TEEi stores the sensitive data on the second computing device and the second TEEi retrieves the sensitive data from the second computing device.

* * * * *